(12) United States Patent
Jin et al.

(10) Patent No.: US 10,526,142 B2
(45) Date of Patent: Jan. 7, 2020

(54) AUTOMATED KIOSK FOR TRANSPORTING AN ITEM WITH A TRAY

(71) Applicant: SIGNIFI SOLUTIONS INC., Mississauga (CA)

(72) Inventors: Yong Suk Jin, Oakville (CA); Shamira Jaffer, Mississauga (CA)

(73) Assignee: SIGNIFI SOLUTIONS INC., Mississauga (CA)

( * ) Notice: Subject to any disclaimer, the term of this patent is extended or adjusted under 35 U.S.C. 154(b) by 0 days.

(21) Appl. No.: 16/073,843

(22) PCT Filed: Mar. 7, 2017

(86) PCT No.: PCT/IB2017/051340
§ 371 (c)(1),
(2) Date: Jul. 30, 2018

(87) PCT Pub. No.: WO2017/153920
PCT Pub. Date: Sep. 14, 2017

(65) Prior Publication Data
US 2019/0031441 A1    Jan. 31, 2019

Related U.S. Application Data

(60) Provisional application No. 62/305,718, filed on Mar. 9, 2016.

(51) Int. Cl.
*G07F 11/16* (2006.01)
*B65G 1/06* (2006.01)
(Continued)

(52) U.S. Cl.
CPC .............. *B65G 1/06* (2013.01); *G06Q 10/087* (2013.01); *G07F 11/165* (2013.01); *G07F 11/58* (2013.01); *G07F 11/60* (2013.01); *G07F 11/62* (2013.01)

(58) Field of Classification Search
CPC ........ G07F 11/165; A47B 63/067; B65G 1/06
See application file for complete search history.

(56) References Cited

U.S. PATENT DOCUMENTS 5,018,926 A    5/1991   Sternad
5,143,193 A *  9/1992   Geraci .................... G07F 7/069
                                                          194/212

(Continued)

FOREIGN PATENT DOCUMENTS

CA    2327225 A1    6/2001
EP    1925762 A1    5/2008

OTHER PUBLICATIONS

Written Opinion of the International Searching Authority dated Jun. 23, 2017 for PCT International Application No. PCT/IB2017/051340.

(Continued)

*Primary Examiner* — Timothy R Waggoner
(74) *Attorney, Agent, or Firm* — Perry + Currier Inc.

(57) ABSTRACT

An automated kiosk includes a storage structure housed by an enclosure, with the storage structure holding trays with items, grabbing unit for picking up trays, dispensing unit for delivering an item, a conveyer mechanism to position the grabbing unit and the dispensing unit and control system. The tray holding an item is associated with the grabbing unit and the dispensing unit and delivers an item to a customer. The tray holding an item can be returned, stocked and restocked by the automated kiosk.

17 Claims, 27 Drawing Sheets

(51) Int. Cl.
    *G07F 11/60* (2006.01)
    *G07F 11/62* (2006.01)
    *G06Q 10/08* (2012.01)
    *G07F 11/58* (2006.01)

(56) References Cited

U.S. PATENT DOCUMENTS

| | | | | |
|---|---|---|---|---|
| 5,206,814 | A * | 4/1993 | Cahlander | G07F 11/62 |
| | | | | 221/88 |
| 6,694,217 | B2 * | 2/2004 | Bloom | G06Q 20/00 |
| | | | | 700/215 |
| 6,758,370 | B2 | 7/2004 | Cooke et al. | |
| 6,851,909 | B2 * | 2/2005 | Campbell | G11B 17/225 |
| | | | | 414/266 |
| 7,086,560 | B2 | 8/2006 | Shioya | |
| 7,097,045 | B2 | 8/2006 | Winkler | |
| 8,060,247 | B2 * | 11/2011 | Kaplan | G07F 9/026 |
| | | | | 700/236 |
| 8,308,414 | B2 * | 11/2012 | Schifman | G07F 11/44 |
| | | | | 100/10 |
| 9,428,336 | B2 * | 8/2016 | Hagen | G07F 11/165 |
| 9,569,912 | B2 | 2/2017 | Faes | |
| 9,659,427 | B2 | 5/2017 | Stinson | |
| 2006/0045674 | A1 * | 3/2006 | Craven | B65G 1/02 |
| | | | | 414/277 |
| 2007/0267087 | A1 * | 11/2007 | Jones | A23G 9/22 |
| | | | | 141/18 |
| 2008/0073373 | A1 * | 3/2008 | Vicentin | G07F 7/069 |
| | | | | 221/210 |
| 2013/0092702 | A1 * | 4/2013 | Holmes | G07F 17/0092 |
| | | | | 221/191 |
| 2013/0264381 | A1 * | 10/2013 | Kim | G07F 17/12 |
| | | | | 232/24 |
| 2017/0073159 | A1 * | 3/2017 | Lossov | G05B 19/124 |

OTHER PUBLICATIONS

International Search Report dated Jun. 23, 2017 for PCT International Application No. PCT/IB2017/051340.

* cited by examiner

AUTOMATED KIOSK FOR TRANSPORTING AN ITEM WITH A TRAY

CROSS-REFERENCE TO RELATED APPLICATIONS

This application claims priority to U.S. Patent Application No. 62/305,718, filed Mar. 9, 2016, which is incorporated herein by reference.

FIELD OF THE INVENTION

The present invention is in the technical field of automated kiosks, vending machines, and the like.

BACKGROUND OF THE INVENTION

Automated kiosks or automated vending machines are becoming popular for selling various kinds of merchandise from packaged large products to small products, such as digital media, mobile electronics, personal accessories and others. Conventional general purpose automated kiosks, however, are not suitable to deliver thin, small or delicate items. The kinds of automated kiosks specialized to sell or rent digital media in particular are not able to dispense items quickly or securely. Problems with known systems become readily apparent with thin products, small products, delicate products (such as stamps or cell phones), and non-conventional products such as medical marijuana.

SUMMARY OF THE INVENTION

There is therefore a need for an automated kiosk that is capable of storing and dispensing thin, small, or delicate items that need to be dispensed gently, quickly, and securely. Accordingly, an automated kiosk is provided that is capable of storing and dispensing thin, small, or delicate items, using efficient stocking space, and with reliable traceability and security, to obviate or mitigate at least one disadvantage of the prior art.

In the following specification, the automated kiosk described herein generally comprises a tray. In some instances, the tray can be used for vending an item, returning an item, stocking the kiosk, or restocking the kiosk. Hence, the tray can be referred to as a "vending tray", "restocking tray", "return tray", or "stocking tray", as the case may be. However it is generally appreciated that the term "tray" can refer to the tray performing any of these functions, as will be appreciated in the relevant context.

According to an aspect of the invention, an automated kiosk is provided. The automated kiosk includes a storing structure housed by an enclosure, the storing structure supporting a slot or series of slots for supporting trays, the trays configured to carry an item. The automated kiosk further comprises a grabbing unit configured to pick up trays, a dispensing unit associated with the grabbing unit, the dispensing unit configured to deliver an item, a conveyer mechanism configured to position the grabbing unit, and a control system configured to send commands to the conveyer mechanism, grabbing unit and dispensing unit.

According to another aspect of the invention, a method for vending an item from automated kiosk is provided. The method includes receiving a vending request indicating an item to be vended, sending a command to a conveyer control system, using the conveyer control system to move a grabbing unit into position for coupling with the vending tray, using the conveyer control system to move the grabbing unit into position for transferring the vending tray to a dispensing unit, identifying delivery of the item, returning empty vending tray to a tray storage location, and storing the location information of the vending tray in a database.

According to another aspect of the invention, a method for returning an item to an automated kiosk is provided. The method includes receiving a return request indicating an item to be returned, sending a command to a conveyer control system, using the conveyer control system to move a grabbing unit into position for coupling with a tray, using the conveyer control system to move the grabbing unit into position for transferring the tray to a dispensing unit, receiving the item on the tray, identifying acceptance of the item, using the conveyer control system to move the grabbing unit into position for returning a return tray to a return location, and storing the location information of the return tray in a database.

According to another aspect of the invention, a method for stocking an item in an automated kiosk is provided. The method includes receiving a stocking request indicating an item to be stocked, receiving the item on a tray, identifying acceptance of the item, using the conveyer control system to move the grabbing unit into position for returning a stocking tray to a stock location, and storing the location information of the stocking tray in a database.

According to another aspect of the invention, a method for restocking an item in an automated kiosk is provided. The method includes receiving a request indicating that an item is to be restocked, sending a command to a conveyer control system, using the conveyer control system to move a grabbing unit into position for coupling with a restocking tray, using the conveyer control system to move the grabbing unit with the restocking tray to a restocking location, and storing the location information of the restocking tray in a database.

DETAILED DESCRIPTION OF THE INVENTION

Figure 1:
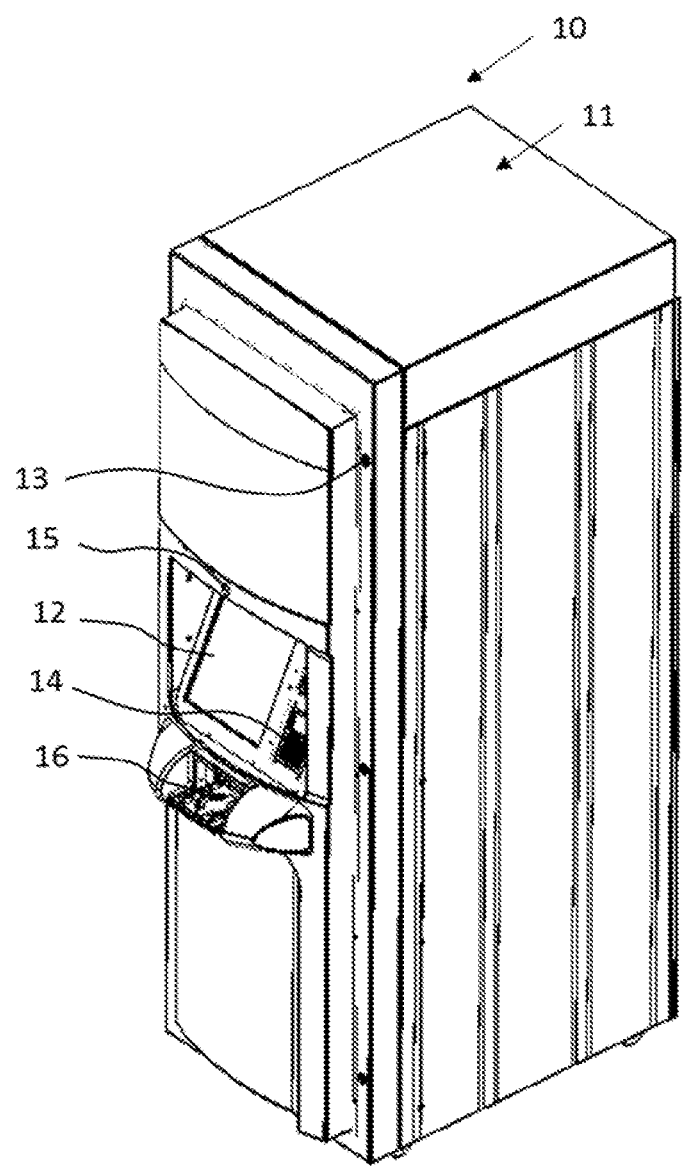
FIG. 1 is a perspective view of an automated kiosk, according to a non-limiting embodiment.
Figure 2:
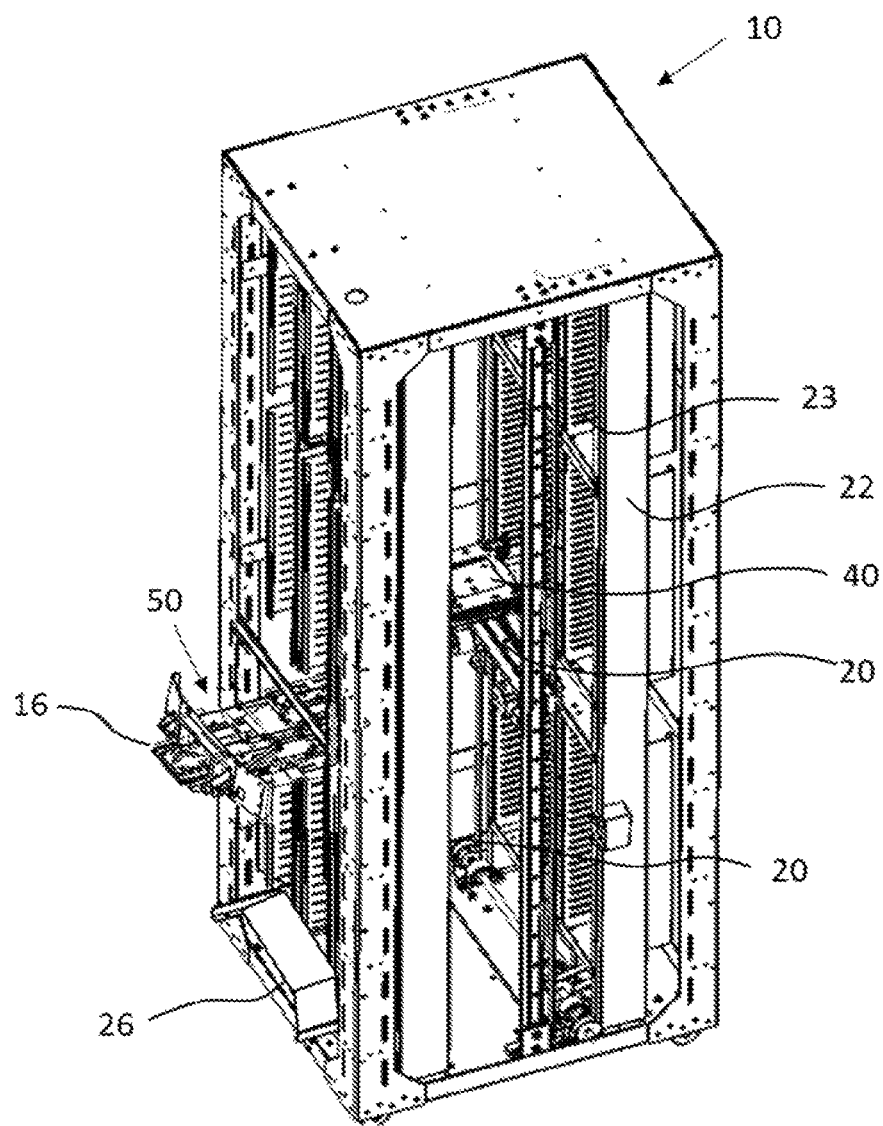
FIG. 2 is a perspective view of an automated kiosk without enclosure, according to a non-limiting embodiment.

Referring to FIGS. 1-2, an automated kiosk 10, which may also be termed an automated vending machine, is shown, according to a non-limiting embodiment. The automated kiosk 10 includes user interface display 12, locking unit 13, payment and identification unit 14, and an opening gate 16 of an enclosure 11. The user interface display 12 can be covered by a protective substrate such as tempered glass or plastic to protect the user interface display 12 from vandalism. Additional displays can be installed for advertisement or instructions to operate the automated kiosk 10. The locking unit 13 can be operated by manual or electromechanical devices. The payment and identification unit 14 can include conventional devices such as a card reader, a keypad and a printer or digital devices like bitcoin applications or biometric devices. The payment and identification unit 14 can also include a camera 15 at the front of the automated kiosk 10 for user interface or user identification. The camera 15 can detect a user's face by using facial recognition techniques.

The automated kiosk 10 contains a conveyer unit 20, racks 22, slots 23, a control system 26, a grabbing unit 40 and a dispensing unit 50 inside the enclosure 11.

Figure 3:
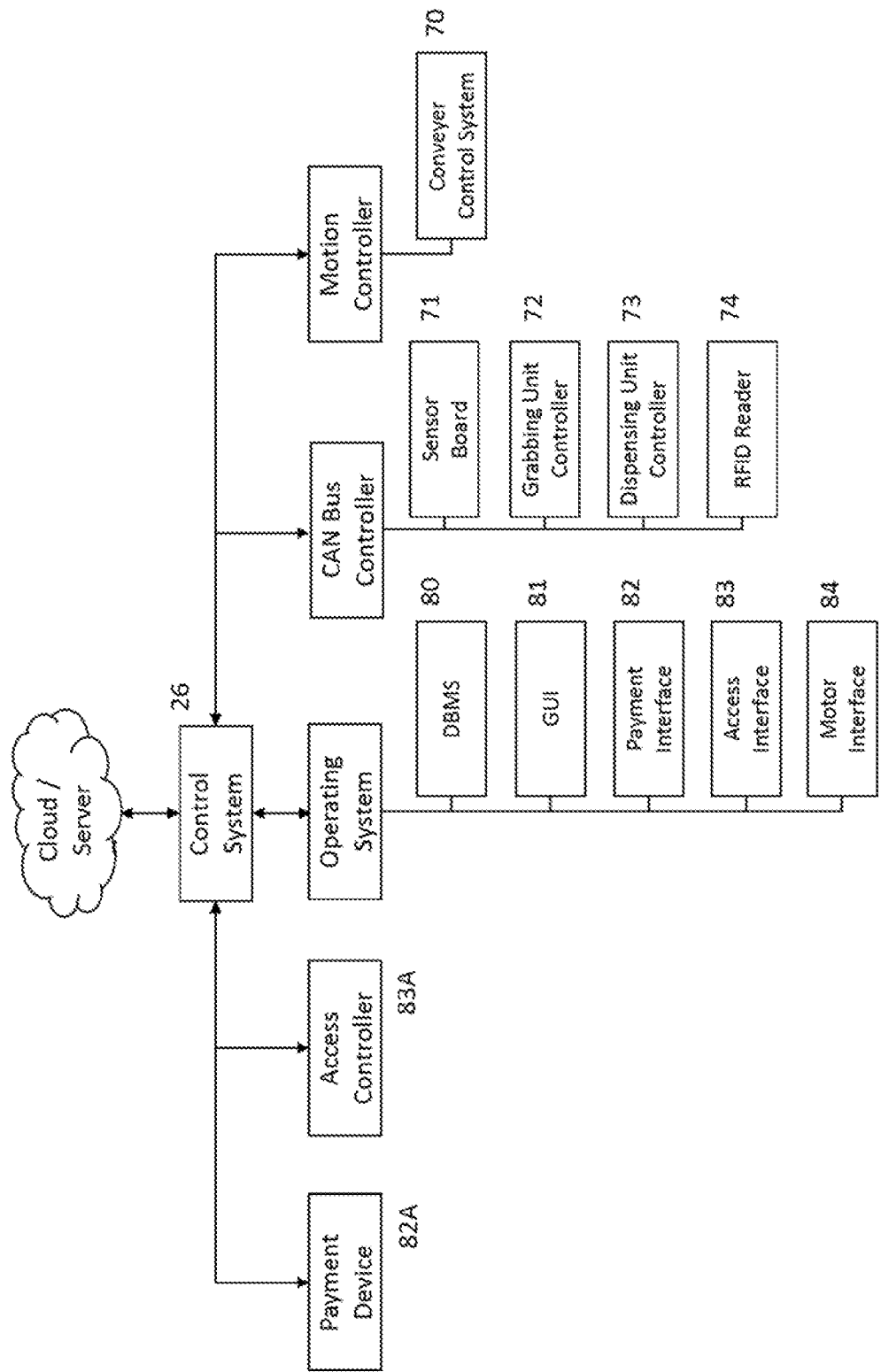
FIG. 3 is a block diagram of a control system of an automated kiosk, according to a non-limiting embodiment.

Referring to FIG. 3, a control system 26 includes a computing system having one or more processors, memory, and communication devices for facilitating its operation and for interfacing with other components of the automated vending machine 10. The term "processor" as discussed herein refers to any quantity and combination of a processor, a central processing units (CPU), a microprocessor, a microcontroller, a field-programmable gate array (FPGA), and similar. The memory of the control system 26 can comprise volatile storage, non-volatile storage, or a combination, such as random-access memory (RAM), read-only memory (ROM), flash memory, optical storage, magnetic storage, and similar.

The control system 26 can communicate with a conveyer control system 70 and database management system (DBMS) 80 to actuate movement of the conveyer unit 20 and move it to the required location according to DBMS 80. The control system 26 also communicates with sensor board 71, grabbing unit controller 72 and dispensing unit controller 73 to control the respective grabbing and dispensing motions of the grabbing unit 40 and dispensing unit 50 according to feedback from sensors 44, 54. Optionally, the control system 26 can communicate with an RFID reader 74 to receive a data from the RFID reader 74 and process it in DBMS 80 accordingly.

The control system 26 also communicates with the user interface display 12 via GUI 81, locking unit 13 via access interface 83 and access controller 83A, payment and identification unit 14 via payment interface 82 and payment device 82A, and an opening gate 16 via motor interface 84 for executing the methods for vending, returning, stocking and restocking, as discussed in greater detail below. In some embodiments, the control system 26 can communicate with external systems, such as network (cloud) systems, over one or more computer networks, which can include the internet, a Wi-Fi network, a local-area network, a wide-area network (WAN), a virtual private network (VPN), a combination of such, and similar. For example, in some embodiments, the control system 26 is configured to alert an external system that it needs to fix problems, and request customer service to solve the problems.

In some embodiments, the automated kiosk 10 can include environmental conditioning system such as cooling or heating devices for temperature control (not shown) and contain thermal insulation to maintain a relatively constant temperature inside the enclosure 11.

Figure 4:
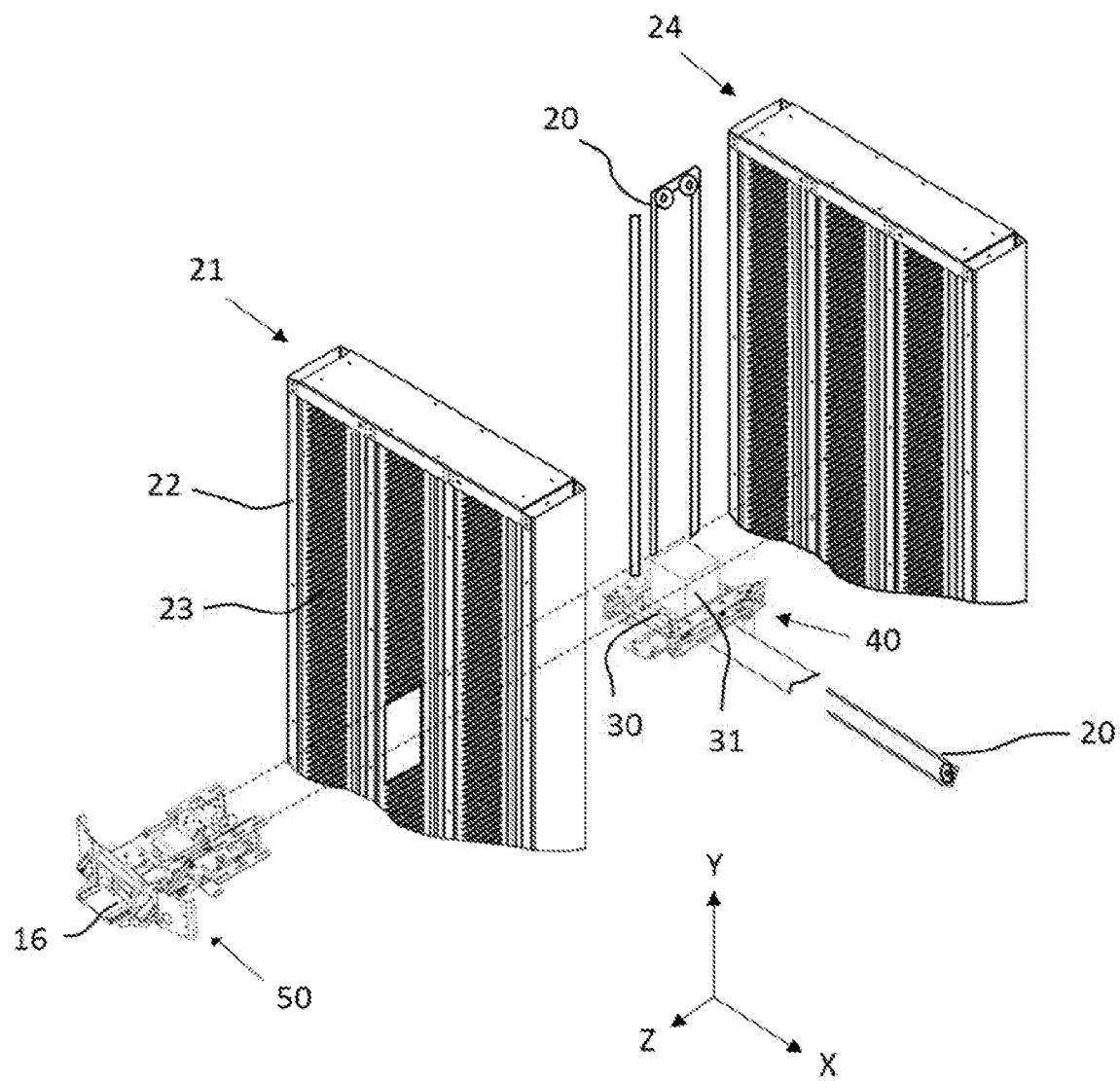
FIG. 4 is an exploded view of an automated kiosk, according to a non-limiting embodiment.

FIG. 4 shows an exploded view of the automated kiosk 10, according to a non-limiting embodiment. A front stocker 21 associated with a dispensing unit 50 includes racks 22 and slots 23 to stock items. A rear stocker 24 also includes racks 22 and slots 23 to stock items. A grabbing unit 40 is placed between the front stocker 21 and the rear stocker 24. The grabbing unit 40 is connected to conveyer unit 20 and includes lead screw motor 43 (See FIGS. 6-7) for moving the grabbing unit 40 in three dimensions (X, Y, and Z directions). The grabbing unit 40 picks up a selected tray 30 with an item 31 to be vended and transfers the tray 30 with the item 31 to the dispensing unit 50. The grabbing unit 40 also picks up the tray 30 with the item 31 from the dispensing unit 50 and moves the tray 30 with the item 31 to the front stocker 21 or the rear stocker 24. A monitoring system with cameras and lights can be installed between the front stocker 21 and the rear stocker 24 for security (not shown).

Figure 5:
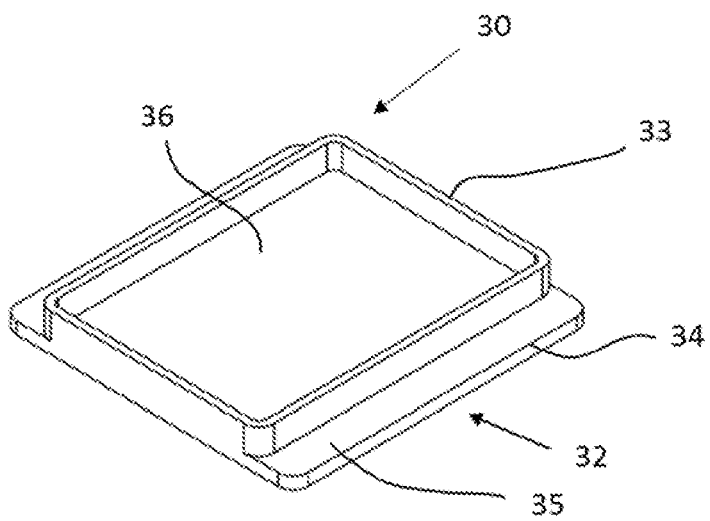
FIG. 5 is a perspective view of a tray illustrating detailed structure, according to a non-limiting embodiment.
Figure 6:
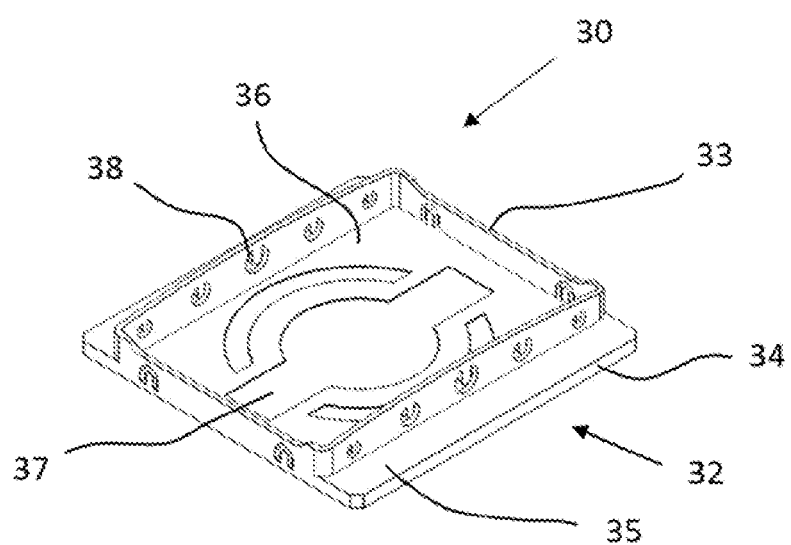
FIG. 6 is perspective view of an alternative tray illustrating structure, according to a non-limiting embodiment.

Referring to FIGS. 5-6, a tray 30 is shown, according to a non-limiting embodiment. The tray 30 has a structure including guiding wings 32 and walls 33. The guiding wings 32 have face edges 34 to contact grabbing belts 42 of the grabbing unit 40 (See FIGS. 7-9) and have face sides 35 to contact transferring wheels 51 at the dispensing unit 50 (See FIG. 9). The walls 33 define an area 36 to hold the item 31 securely. Therefore the item 31 is located in the area 36 within the walls 33. The tray 30 can have a groove structure 37 in the area 36 to pick up a thin product like a gift card easily. The tray 30 can include hook structure 38 to install strings or elastics to hold an item more securely. The tray 30 can also incorporate elements such as adhesive materials, magnets or clips to hold a thin item securely. In an embodiment, the material of the tray 30 can be permeable to electromagnetic fields for radio frequency identification (RFID) sensing. For example, a plastic tray 30 holding the item 31 can have an RFID tag (not shown) attached to the tray 30 or the item 31. The RFID tag can be used for RFID sensing system.

Figure 7:
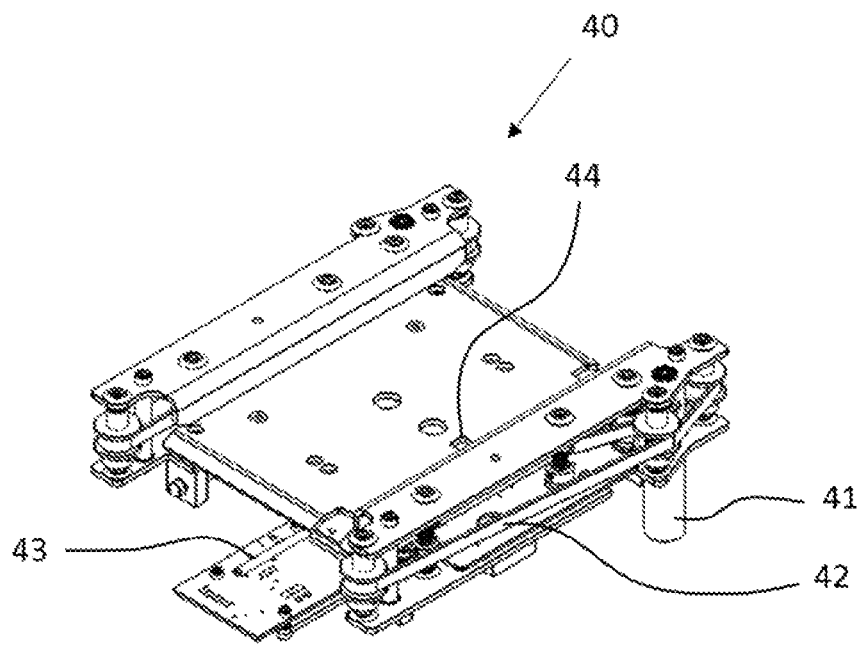
FIG. 7 is a perspective view of a grabbing unit illustrating detailed structure, according to a non-limiting embodiment.
Figure 8:
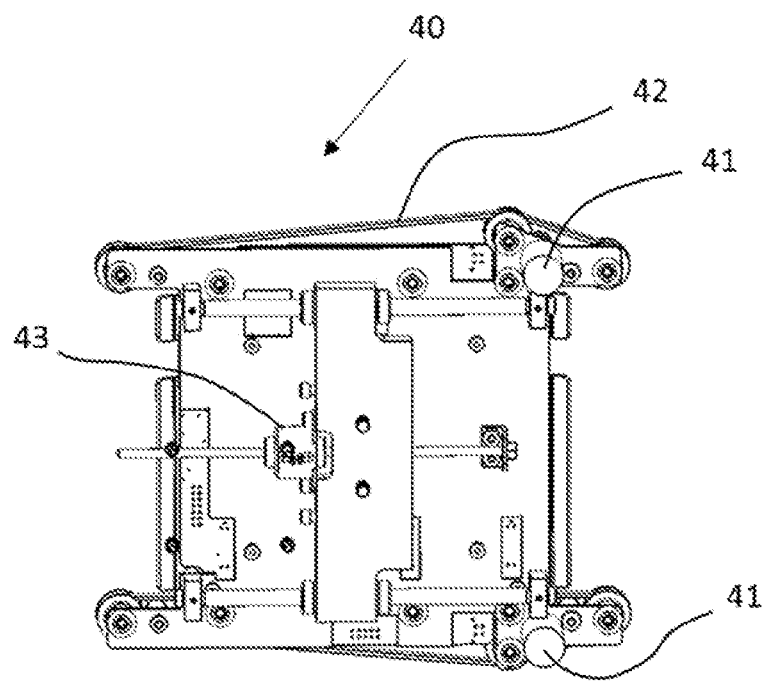
FIG. 8 is a bottom view of a grabbing unit illustrating detailed structure, according to a non-limiting embodiment.
Figure 9:
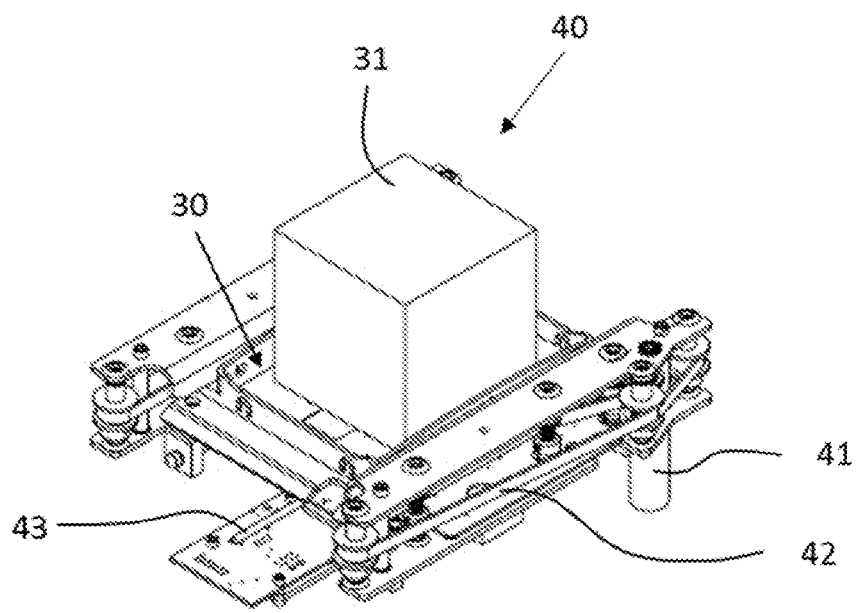
FIG. 9 is a perspective view of a grabbing unit with an item, according to a non-limiting embodiment.

Referring to FIGS. 7-9, a grabbing unit 40 is shown, according to a non-limiting embodiment. The grabbing unit 40 can be located between the front stocker 21 and the rear stocker 24. The grabbing unit 40 includes drive motors 41, grabbing belts 42, a lead screw motor 43 and bottom sensors 44. The lead screw motor 43 helps the grabbing unit 40 move near the tray 30 holding item 31 in the front stocker 21 or in the rear stocker 24. The grabbing belts 42 contact the tray 30 holding the item 31 and rotate to transfer the tray 30 holding the item 31 into the grabbing unit 40. The grabbing belts stop rotating when the bottom sensors 44 detect the position of the tray 30 holding the item 31 on the grabbing unit.

In this embodiment, the bottom sensors 44 can detect when the tray 30 containing item 31 has been transferred to the dispensing unit 50, and thereby signal the grabbing unit controller 72 to shut off the drive motors 41 and grabbing unit 40. The grabbing unit 40 can include an RFID sensor (not shown) to detect the item information.

Figure 10:
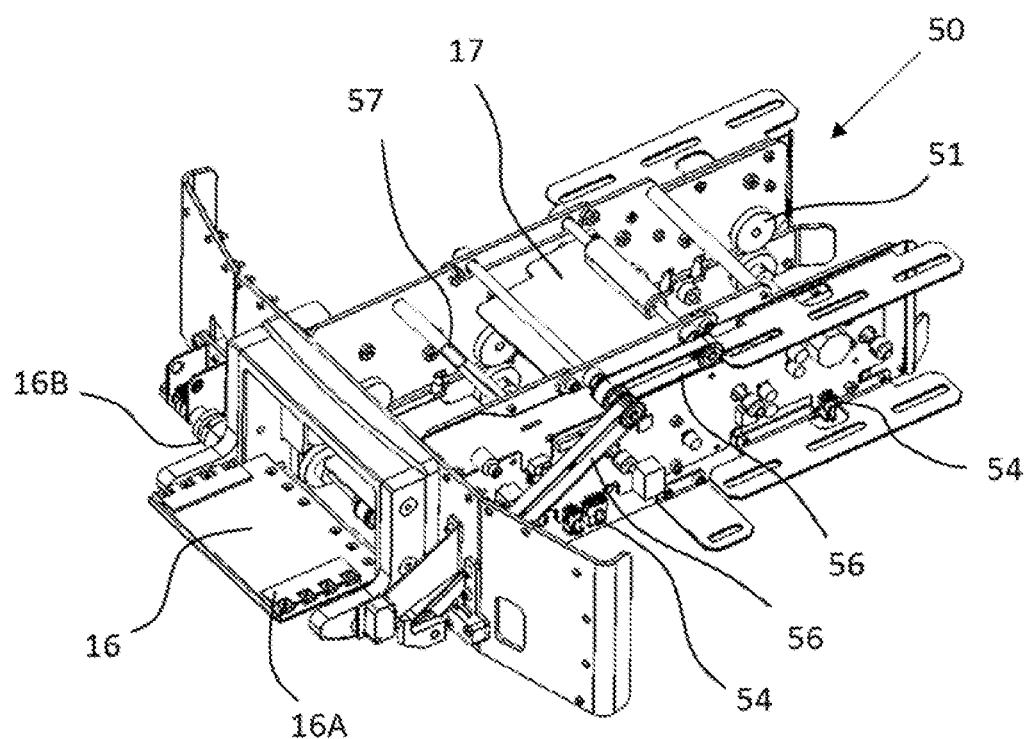
FIG. 10 is a perspective view of a dispensing unit with a shutter illustrating detailed structure, according to a non-limiting embodiment.
Figure 11:
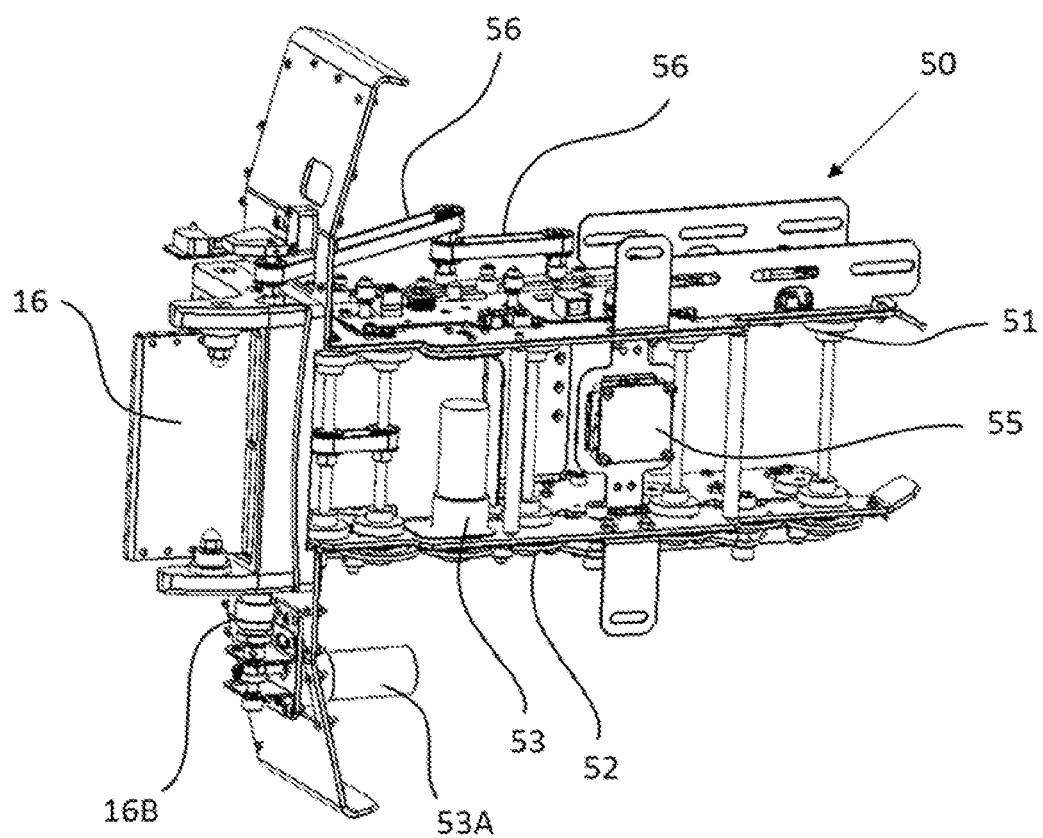
FIG. 11 is a bottom view of a dispensing unit with a shutter illustrating detailed structure, according to a non-limiting embodiment.

Referring to FIGS. 10-11, a dispensing unit 50 is shown, according to a non-limiting embodiment. The dispensing unit 50 includes transferring wheels 51, gears 52, drive motor 53, side sensors 54, and an opening gate 16. The transferring wheels 51 are associated with the gears 52 and the drive motor 53. The transferring wheels 51 contact a tray 30 holding an item 31 and move the tray 30 holding the item 31 to the dispensing end of the dispensing unit 50. When the tray 30 holding the item 31 comes near the dispensing unit 50, the side sensors 54 detect the tray 30 holding the item 31 and communicate with the dispensing unit controller 73 to make the transferring wheels 51 move. The dispensing unit 50 can include an RFID sensor 55. The dispensing unit can incorporate a shutter 17 to prevent a user from reaching inside when the opening gate 16 is open. The shutter 17 is associated with the opening gate 16 and shutter belts 56 driven by a front opening motor 53A. In an embodiment, the front opening motor may use a worm drive mechanism. As the opening gate 16 rotates outward to be open, the shutter 17 rotates downward to be closed. As the opening gate 16 rotates inward to be closed, the shutter 17 rotates upward to be open and the tray 30 can pass through. For safety reason, the front opening motor 53A can be associated with safety coupling 16B for torque control. The opening gate 16 can have a tray lock 16A to prevent the tray 30 from being removed.

In an embodiment, the dispensing unit 50 can include embedded monitoring camera 57 to identify the presence of an item in the dispensing unit 50 thus monitor whether a customer picks up an item or not.

In some embodiments, the bottom sensors 44 and side sensors 54 are operated by optical sensing techniques. In an embodiment, the speed of the drive motors 41, 53 can be controlled by DC currents.

In some embodiments, the dispensing unit 50 can include lighting devices (not shown) to illuminate the tray 30 holding the item and to remind a customer to retrieve the item 31. The dispensing unit 50 can include a sound alarm to remind a customer to retrieve the item 31.

Figure 12:
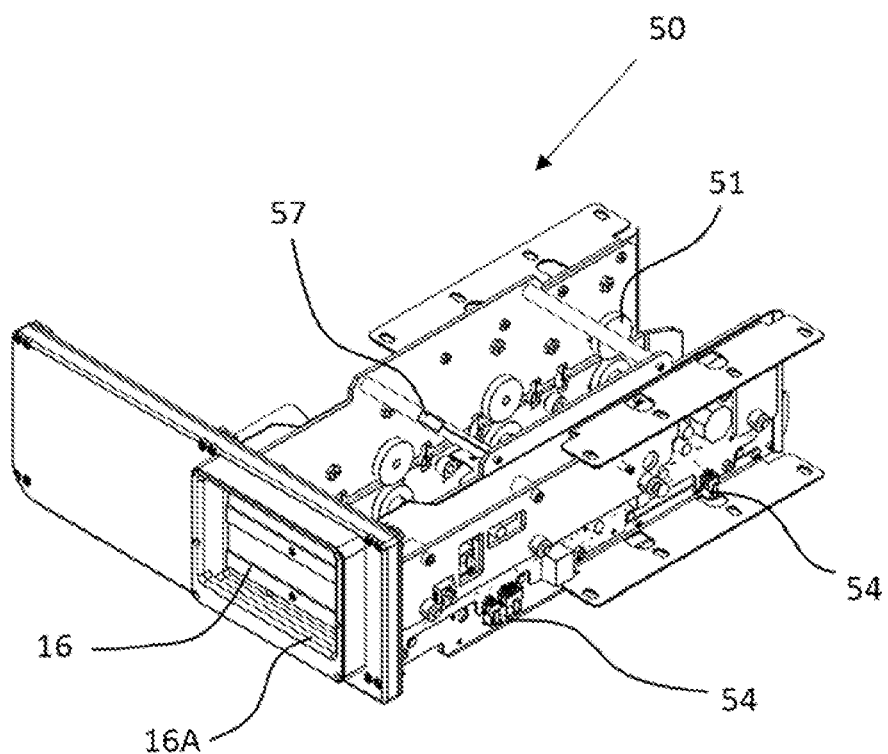
FIG. 12 is a perspective view of an alternative dispensing unit illustrating detailed structure, according to a non-limiting embodiment.
Figure 13:
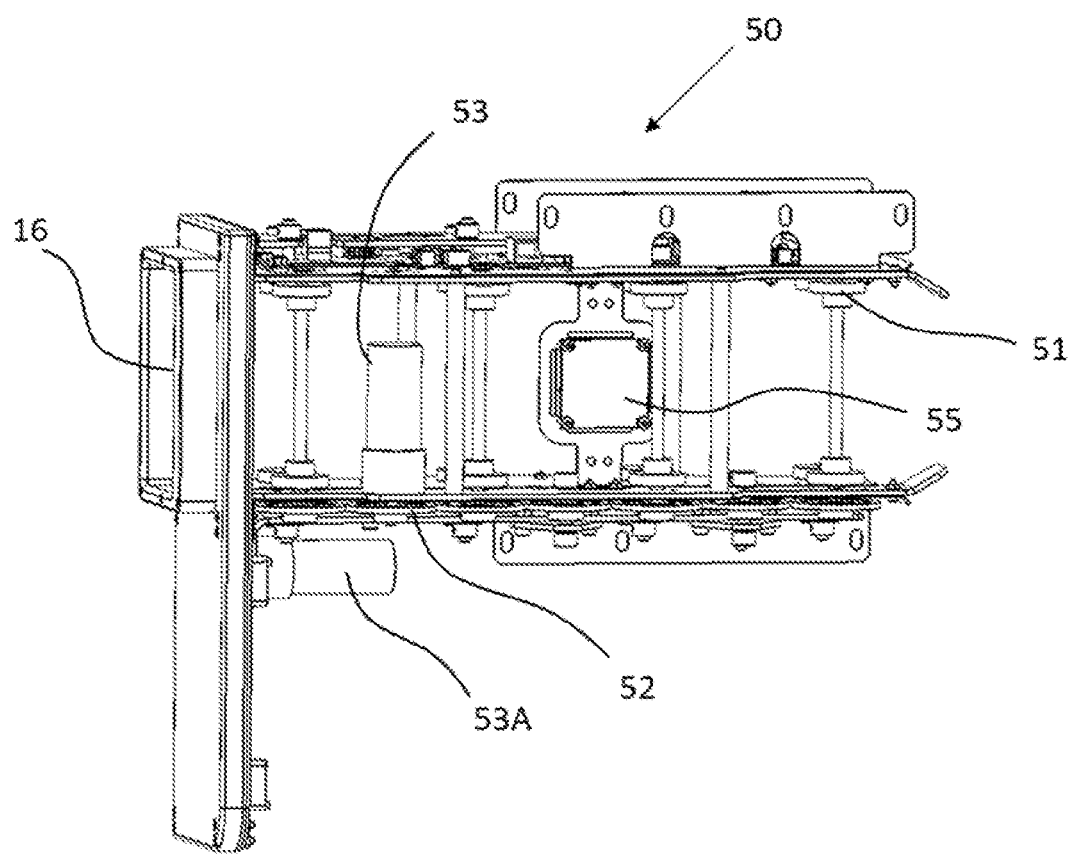
FIG. 13 is a bottom view of an alternative dispensing unit illustrating detailed structure, according to a non-limiting embodiment.

FIGS. 12-13 show another embodiment of the dispensing unit 50. The dispensing unit 50 includes transferring wheels 51, gears 52, drive motor 53, side sensors 54, and an opening gate 16. The transferring wheels 51 are associated with the gears 52 and the drive motor 53. The transferring wheels 51 contact a tray 30 holding an item 31 and move the tray 30 holding the item 31 to the dispensing end of the dispensing unit 50. When the tray 30 holding the item 31 comes near the dispensing unit 50, the side sensors 54 detect the tray 30 holding the item 31 and communicate with the dispensing unit controller 73 to make the transferring wheels 51 move. The dispensing unit 50 can include an RFID sensor 55. In this embodiment, the opening gate 16 is operated by a rack and pinion drive (not shown). The rack and pinion drive is associated with the front opening motor 53A to move the opening gate 16 horizontally. For safety reason, the front opening motor 53A can be associated with controllers or sensors to control the speed of the front opening motor 53A. The opening gate 16 can have a tray lock 16A to prevent the tray 30 from being removed.

Figure 14:
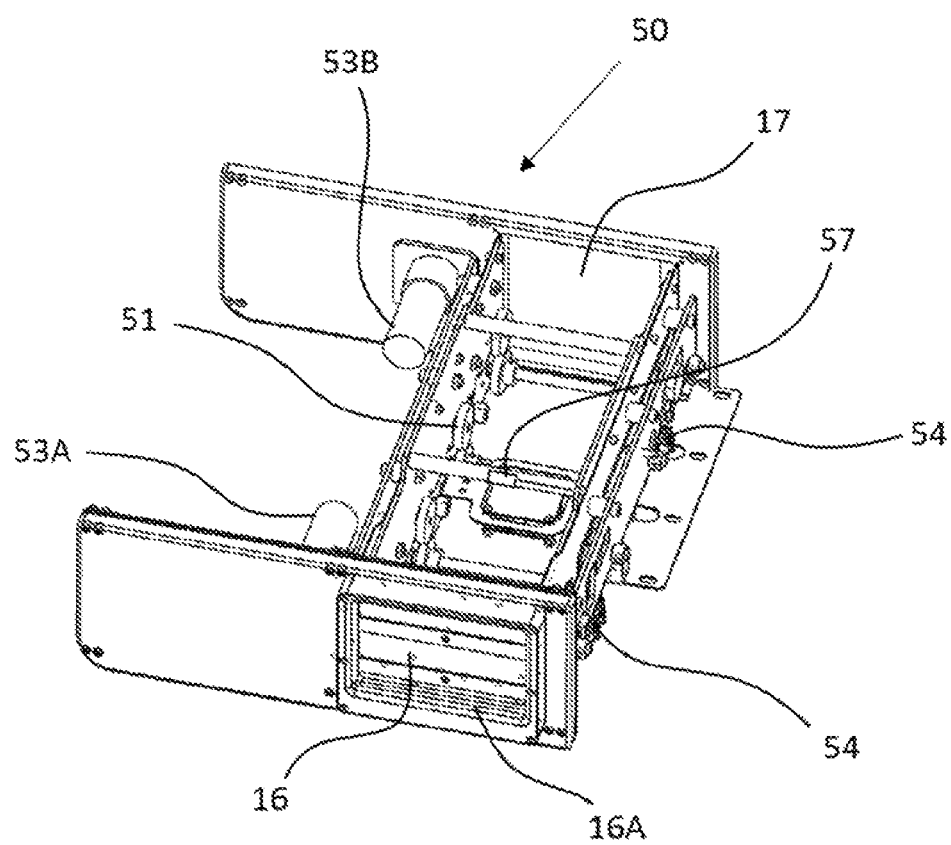
FIG. 14 is a perspective view of an alternative dispensing unit with a shutter illustrating detailed structure, according to a non-limiting embodiment.
Figure 15:
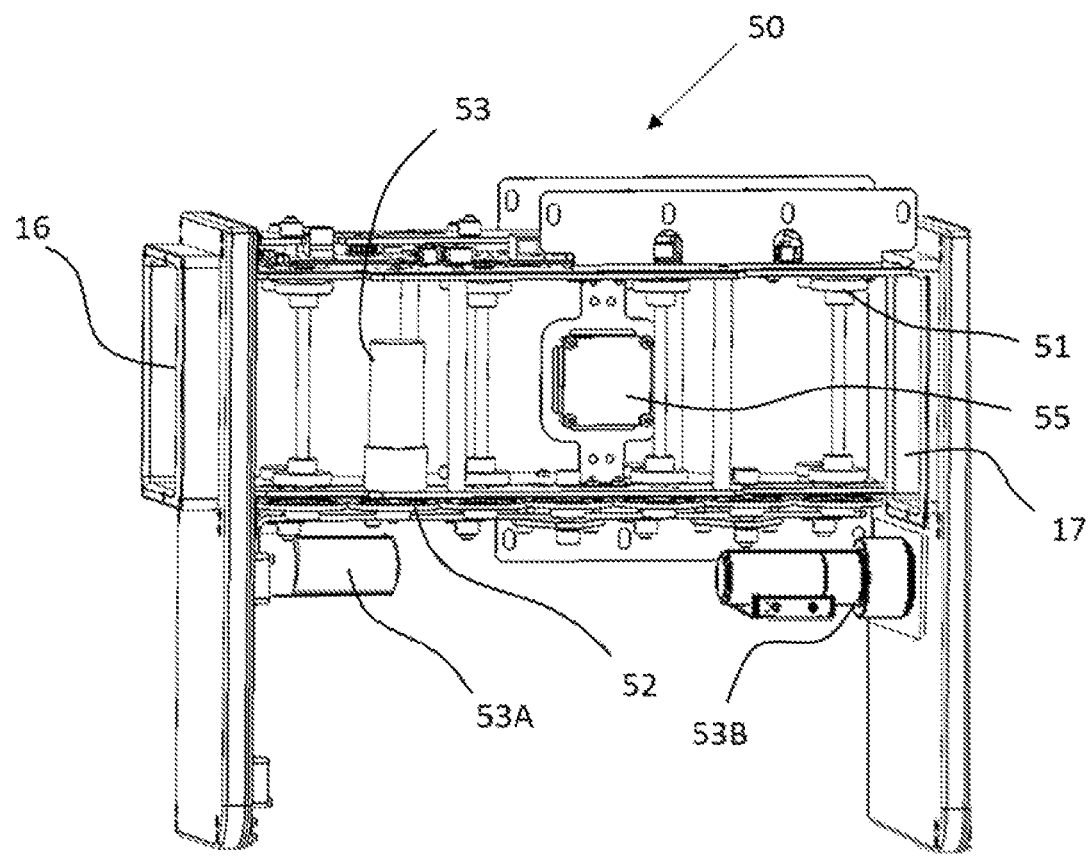
FIG. 15 is a bottom view of an alternative dispensing unit with a shutter illustrating detailed structure, according to a non-limiting embodiment.

In some embodiments (See FIGS. 14-15), the dispensing unit can incorporate a shutter 17 to prevent a user from reaching inside when the opening gate 16 is open. The shutter 17 is driven by a rear opening motor 53B with a rack and pinion drive (not shown). As the opening gate 16 slides open by the front opening motor 53A, the shutter 17 slides closed by rear opening motor 53B. As the opening gate 16 slides closed, the shutter 17 slides open and the tray 30 can pass through.

Figure 16:
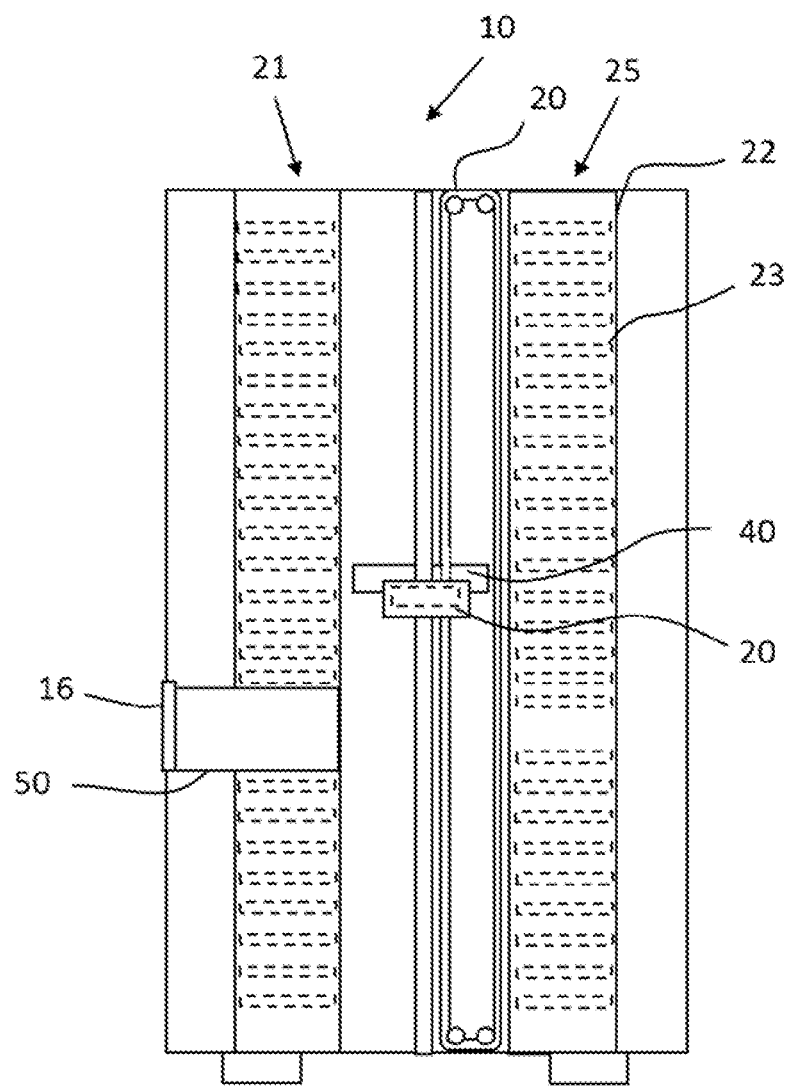
FIG. 16 is a side view of an automated kiosk with single dispensing unit, according to a non-limiting embodiment.
Figure 17:
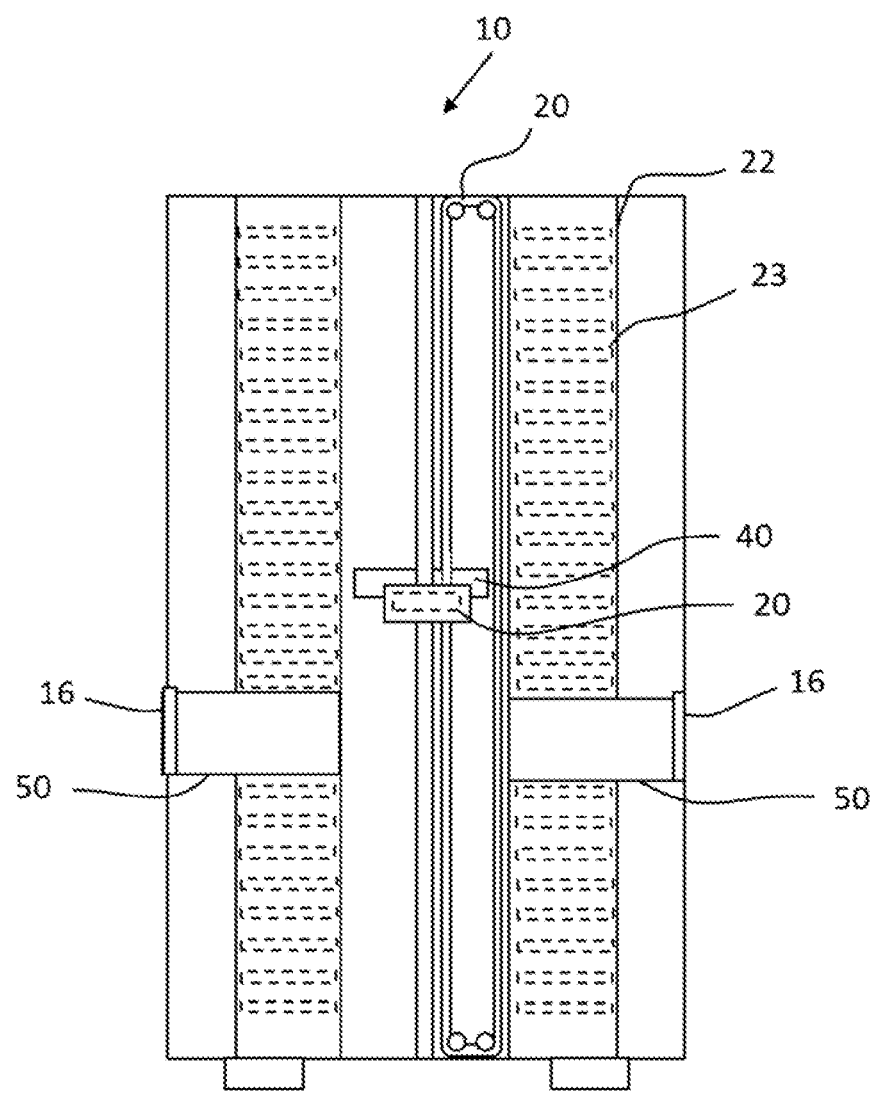
FIG. 17 is a side view of an automated kiosk with dual dispensing units, according to a non-limiting embodiment.

Referring to FIGS. 16-17, a side view of the automated kiosk 10, is shown, according to a non-limiting embodiment. The automated kiosk 10 includes racks 22, slots 23, conveyer unit 20, grabbing unit 40 and dispensing unit 50, FIG. 16 is a side view of an automated kiosk 10 with single dispensing unit 50. FIG. 17 is a side view of an automated kiosk with two dispensing units 50, according to a non-limiting embodiment. The dispensing unit 50 can be installed on two sides of the automated kiosk 10 for multiple users. In this embodiment, the dispensing units 50 can share the grabbing unit 40.

Figure 18:
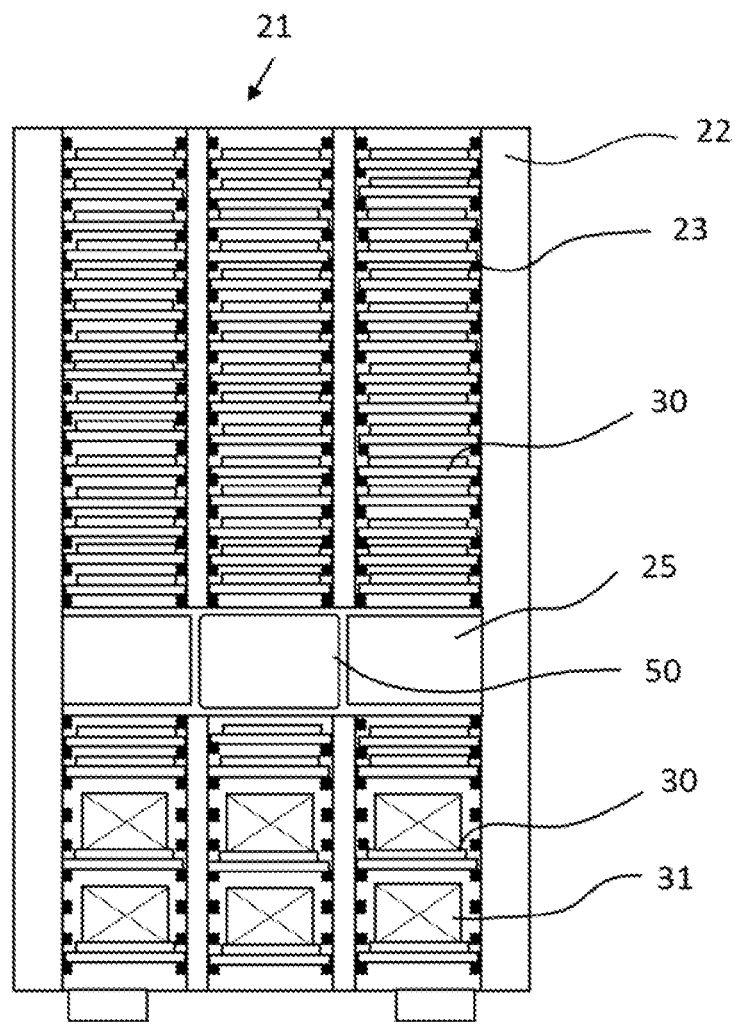
FIG. 18 is a front view of a front stocker with rack and slot structure containing items, according to a non-limiting embodiment.
Figure 19:
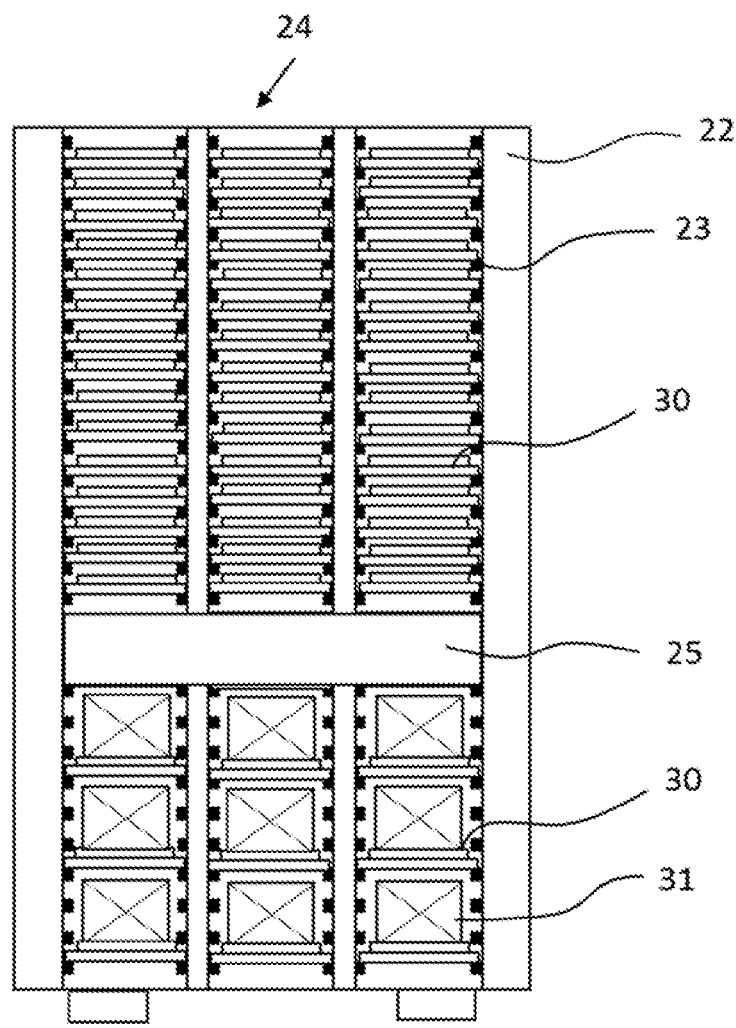
FIG. 19 is a front view of a rear stocker with rack and slot structure containing items, according to a non-limiting embodiment.

FIG. 18 shows a front view of a front stocker with a rack and slot structure for supporting trays containing items, according to a non-limiting embodiment. FIG. 19 is a front view of a rear stocker with a rack and slot structure for supporting trays containing items, according to a non-limiting embodiment. The front stocker 21 holds the trays 30 holding the items 31, leaving a space for the dispensing unit 50. The rear stocker 24 also holds trays 30 holding the items 31. The front stocker 21 and the rear stocker 24 can include tray buffer area 25 to hold trays which have been identified as having a problem. For example, a problem may be the tray 30 not coupling properly with the slots 23. In more detail, referring to FIGS. 18-19, trays 30 holding items 31 are inserted into slots 23. The pitch between the slots 23 is typically 1 cm. Depending on the height of the items 31, the items 31 may occupy more than one pitch. The dispensing unit 50 can include sensors to detect the height of the item 31.

Figure 20:
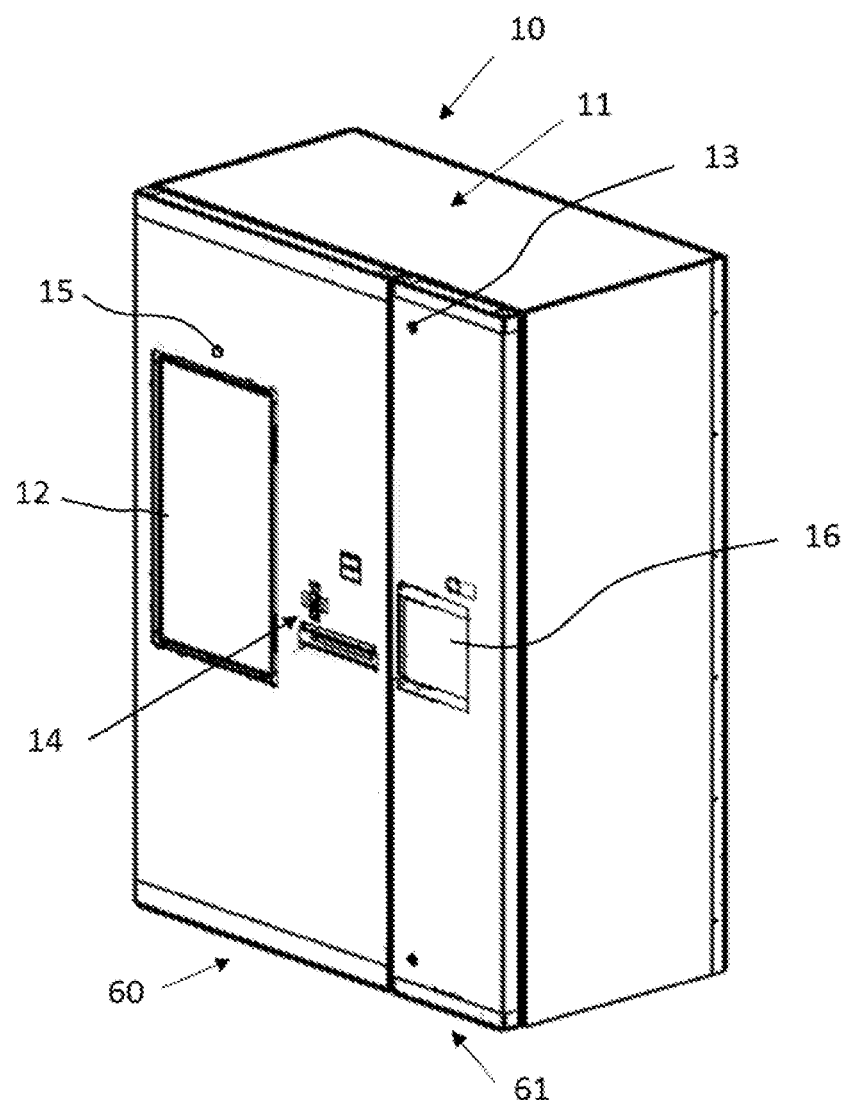
FIG. 20 is a perspective view of an automated kiosk separated into a storage area and a restock area, according to a non-limiting embodiment.
Figure 21:
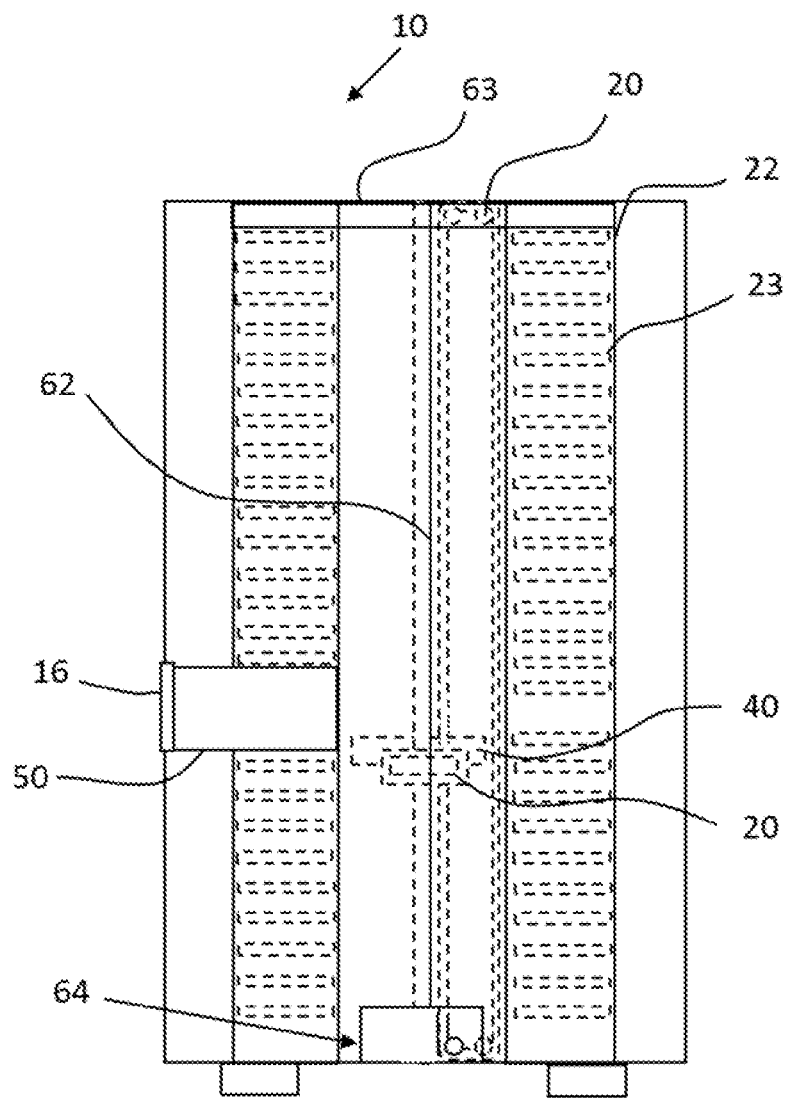
FIG. 21 is a side view of an automated kiosk separated into a storage area and a restock area, according to a non-limiting embodiment.
Figure 22:
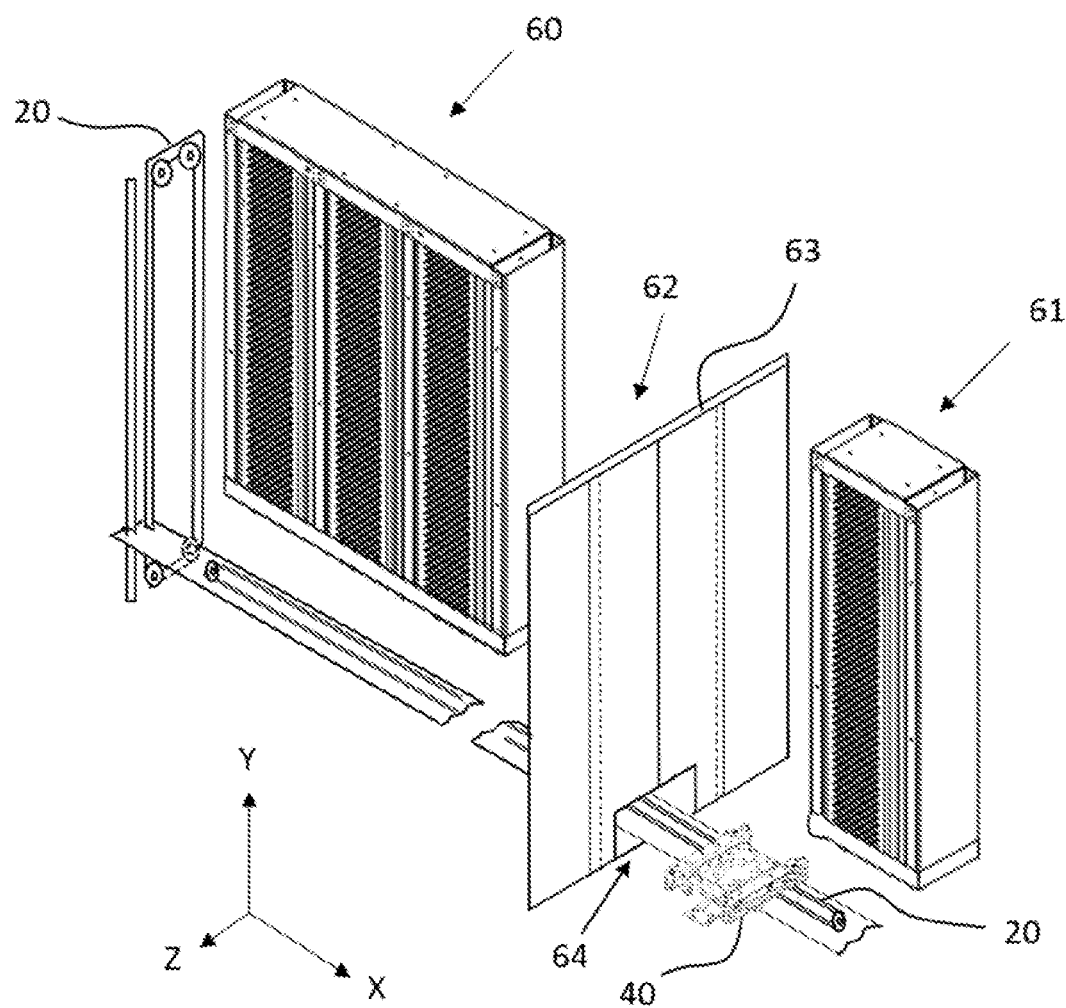
FIG. 22 is an exploded view of an automated kiosk separated into a storage area and a restock area by separating doors, according to a non-limiting embodiment.

FIGS. 20-22 show another embodiment of the automated kiosk 10 in which the automated kiosk 10 is divided into two areas, a storage area 60 and a restock area 61, for higher security, according to a non-limiting embodiment.

Referring to FIG. 20, the automated kiosk 10 is divided into two areas, according to a non-limiting embodiment. A storage area 60 houses racks 22 for storing trays 30 with items 31 to be delivered. A restock area 61 accepts items to be restocked and delivers the items to customers. The storage area 60 includes a user interface display 12, locking unit 13 and payment and identification unit 14. The user interface display 12 can be covered by a protective substrate such as tempered glass or plastic to protect the user interface display 12 from vandalism. The storage area 60 or the restock area 61 or both the storage area 60 and the restock area 61 can include environmental conditioning system such as cooling or heating devices for temperature control. Some pharmaceutical items require constant cool temperature to sustain the quality of the items. The locking unit 13 can be operated by manual or electromechanical devices or both manual and electromechanical devices. When the items require higher security, the locking unit 13 can be monitored by external monitoring system. For example, when pharmaceutical items, medical items or precious accessories are restocked, external monitoring system can trace the log record of door opening.

The payment and identification unit 14 can include conventional devices like a card reader, a keypad and a printer or digital devices like bitcoin applications or biometric devices. The payment and identification unit 14 can also include a camera 15, a scanner, a microphone and a speaker at the front of the automated kiosk 10 for user interface or user identification.

In an embodiment, the camera 15 with wide viewing angle lens and high resolution can detect user's face or environment around the automated kiosk 10 by using face or surround recognition functions. The camera 15 can also embed microphones to receive sound information.

In an embodiment, the scanner can be used for reading IDs (identifications) or documents to verify the level of access of the user.

FIGS. 21-22 show a non-limiting embodiment of separating the storage area 60 and the restock area 61 for higher security. Besides the shutter 17 to prevent theft from outside, a separating door 62 can be installed to block access from the restock area 61 to the storage area 60. Certain items such as medical marijuana require strict controls which require separation of the storage area 60 and the restock area 61. As an operator opens the locking unit 13 of the restock area 61, the separating door 62 is closed. The separating door 62 is driven by door drive 63 with moving mechanism such as motors, gears or belts. There is a pass-through 64 at the bottom of the separating door 62 for resting the grabbing unit. Therefore the operator cannot access the items in the storage area 60. There can be separated authorizations to access the storage area 60 by security rules.

Figure 23:
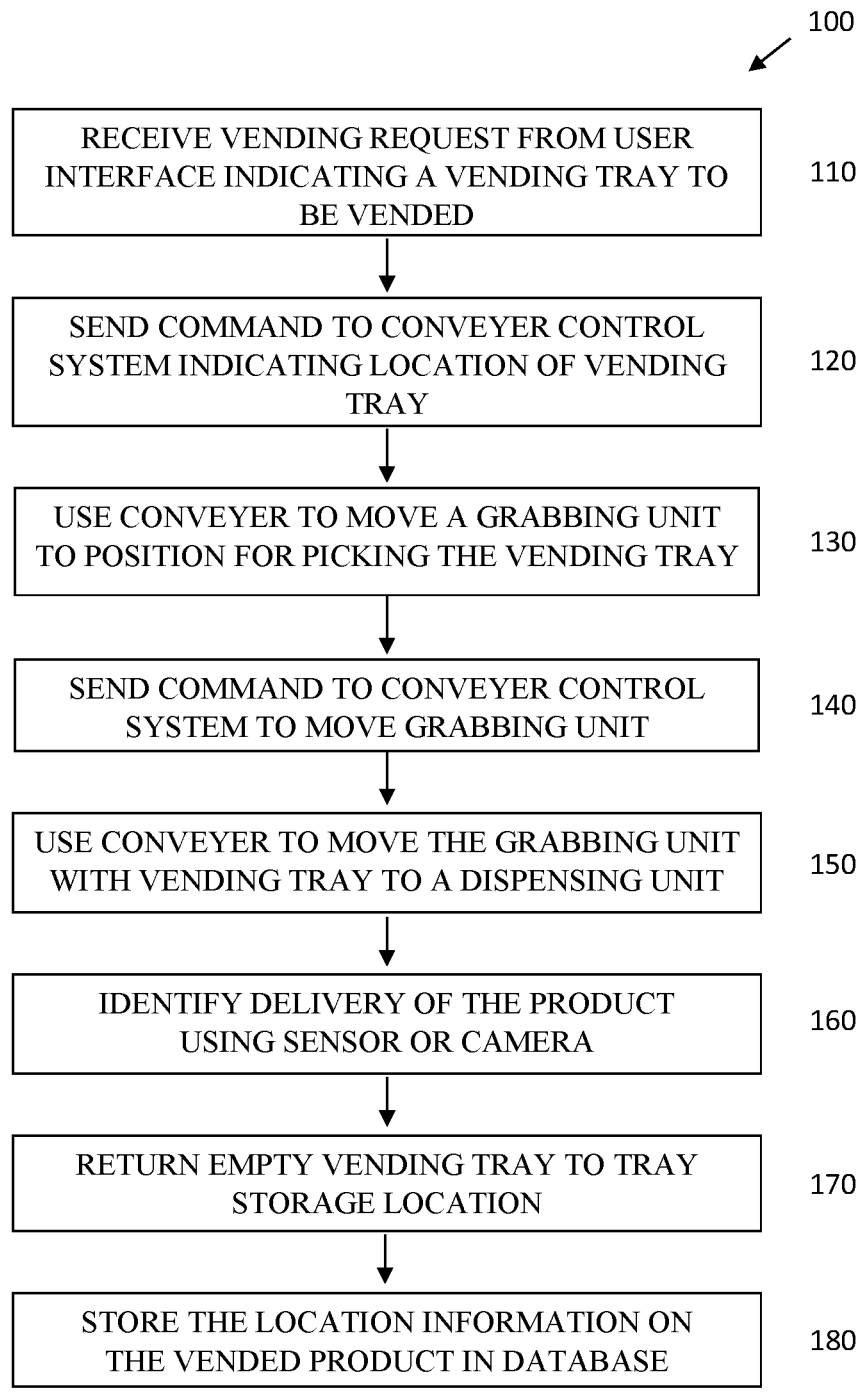
FIG. 23 is a flowchart illustrating a method for vending an item, according to a non-limiting embodiment.

Referring to FIG. 23, an exemplary method 100 of vending an item 31 to a customer is disclosed, according to a non-limiting embodiment. It is emphasized that the steps need not be performed in the exact sequence as shown. At step 110, a vending request is received indicating a tray 30 with an item 31 to be vended (a "vending tray"). In an embodiment, the vending request can be received by the automated kiosk 10 from a customer through the user interface display 12 and payment and identification unit 14 to deliver the vending tray. Some items used in the fields of healthcare can require more strict identification process to a customer for security and traceability. For example, medical marijuana vending can require IDs, documents or recognitions of finger prints.

At step 120, a command is sent to a conveyer control system indicating the location of the vending tray. In an embodiment, the automated kiosk 10 can send a command to the conveyer control system 70 based on the location information stored in the automated kiosk 10 or cloud systems associated with the vending tray.

At step 130, a conveyer unit 20 is used to move a grabbing unit 40 into position for picking up the vending tray. In an embodiment, the conveyer unit 20 is used to move the grabbing unit 40 to pick up the vending tray by the following action. The grabbing unit 40 moves to the designated location of the vending tray. The grabbing unit 40 moves close to the vending tray using a lead screw motor 43 and grabbing belts 42 rotate to pick up the vending tray. The grabbing belts 42 stop rotating by bottom sensors 44 detecting the proper position of the vending tray. At this step, the grabbing unit 40 can use an RFID sensor (not shown) for identifying the item 31.

At step 140, a command is sent to a conveyer control system indicating the location of the dispensing unit 50. In an embodiment, the automated kiosk 10 can send a command to the conveyer control system 70 indicating that the vending tray is to be dispensed to the dispensing unit 50.

At step 150, a conveyer unit 20 is used to move a grabbing unit 40 with a coupled vending tray to the dispensing unit 50. In an embodiment, the conveyer unit 20 is used to move the grabbing unit 40 to the dispensing unit 50.

At step 160, the dispensing unit 50 dispenses the item 31 to a customer. In an embodiment, the dispensing unit 50 dispenses the item 31 by the following action. When the grabbing unit 40 coupled with the vending tray moves near the dispensing unit 50, transferring wheels 51 rotate to take the vending tray. The transferring wheels 51 stop rotating by side sensors 54 detecting the proper position of the vending tray. Optionally, RFID sensor 55 identifies the item 31. Opening gate 16 is opened, allowing a customer to pick the item up. It is optional at this point for sensors or cameras to detect whether the item was successfully retrieved by a customer. In an embodiment, sensors or a monitoring camera 57 attached to the dispensing unit 50 can identify whether the item 31 remains. If the item 31 remains, the automated kiosk 10 can remind the customer to retrieve the item 31.

At step 170, the dispensing unit 50 and the grabbing unit 40 return an empty vending tray 30 to a storage location. In an embodiment, the dispensing unit 50 and the grabbing unit 40 move the empty vending tray 30 to the storage location by the following action. When the opening gate 16 has been closed, the transferring wheels 51 rotate reversely to move the empty vending tray 30 towards the grabbing unit 40. The grabbing belts 42 rotate reversely to pick up the empty vending tray 30 and transfer the empty vending tray 30 to the grabbing unit 40. The grabbing unit 40 coupled with the empty vending tray 30 moves to the designated slot 23 in rack 22. Optionally, the storage location to which the tray 30 is returned may be in storage area 60, separate from restock area 61. The grabbing unit 40 moves close to the designated slot 23 in rack 22 using a lead screw motor 43. The grabbing belts 42 rotate to transfer the empty vending tray 30 from the grabbing unit 40 to the slot 23. The grabbing belts 42 stop rotating by bottom sensors 44 detecting the absence of the empty vending tray 30.

At step 180, the automated kiosk 10 stores the location information of a vending tray in a database. In an embodiment, the automated kiosk 10 stores the information of the vending tray and updates the location of empty slots 23 and trays 30 in a database. Besides the location information, the database can contain information such as the operation log record, the item history and others for traceability and security.

Figure 24:
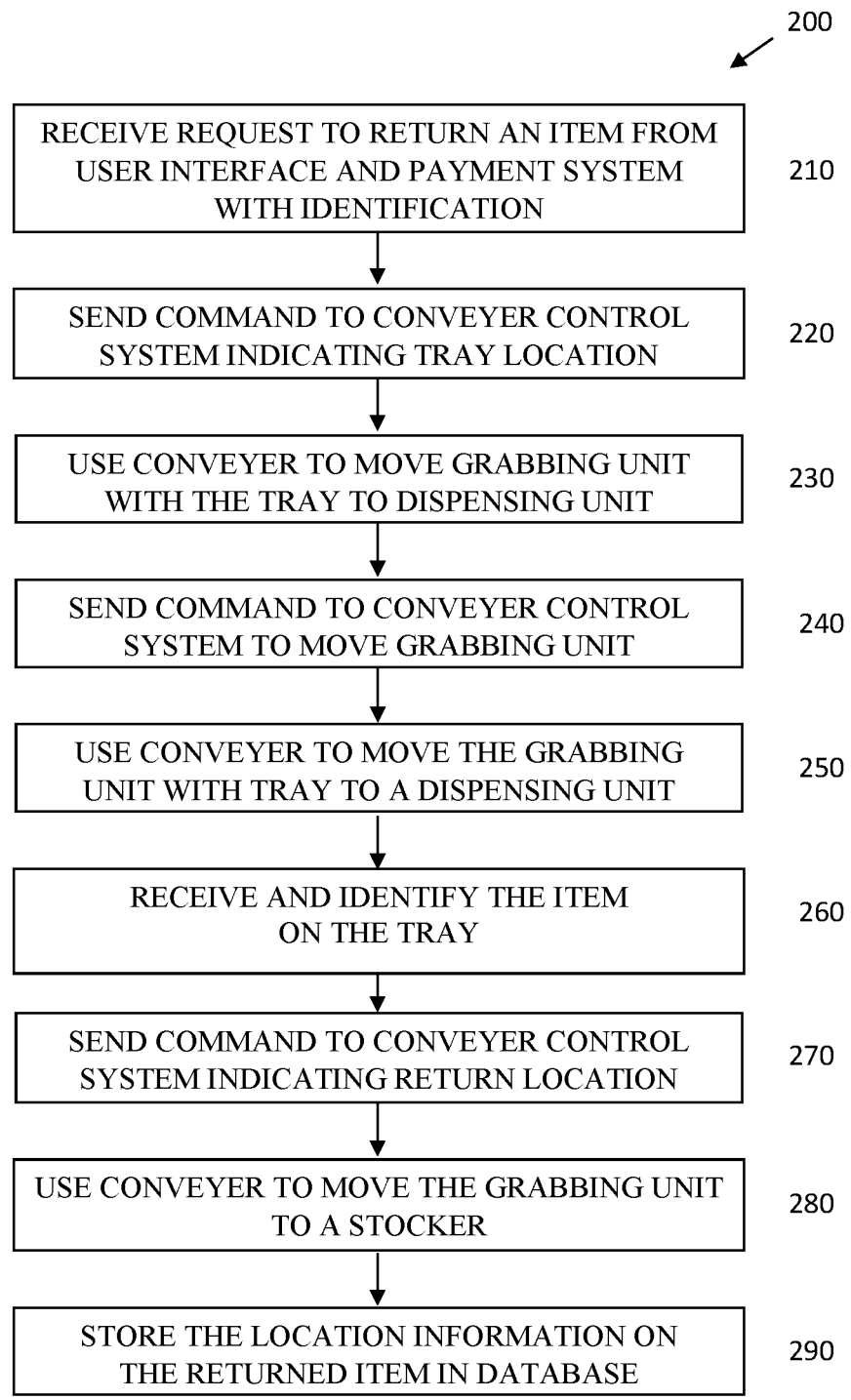
FIG. 24 is a flowchart illustrating a method for returning an item, according to a non-limiting embodiment.

FIG. 24 shows an exemplary method 200 of returning an item 31 to an automated kiosk 10, according to a non-limiting embodiment. It is emphasized that the steps need not be performed in the exact sequence as shown.

At step 210, a return request is received indicating a tray 30 with an item 31 to be returned (a "return tray"). In an embodiment, the return request can be received by the automated kiosk 10 from a customer through the user interface display 12 and payment and identification unit 14 to return the item 31.

At step 220, a command is sent to a conveyer control system indicating the location of an empty return tray 30. In an embodiment, the automated kiosk 10 can send a command to the conveyer control system 70 indicating that the empty return tray 30 is placed in a storage location.

At step 230, the conveyer unit 20 is used to move a grabbing unit 40 into position for coupling with the empty return tray 30. In an embodiment, the conveyer unit 20 is used to move the grabbing unit 40 to the storage location where vending trays or trays are stored. The grabbing unit 40 picks up the empty return tray 30 by the following action. The grabbing unit 40 moves to the designated location of the empty return tray 30. The grabbing unit 40 moves closely to the empty return tray 30 using a lead screw motor 43 and grabbing belts 42 rotate to pick up the empty return tray 30. The grabbing belts 42 stop rotating by bottom sensors 44 detecting the proper position of the empty return tray 30.

At step 240, a command is sent to a conveyer control system indicating the location of the dispensing unit 50. In an embodiment, the automated kiosk 10 can send a command to the conveyer control system 70 indicating that the empty return tray 30 is to be dispensed to the dispensing unit 50.

At step 250, a conveyer unit 20 is used to move a grabbing unit 40 with a coupled empty return tray 30 to a dispensing unit 50. In an embodiment, the conveyer unit 20 is used to move the grabbing unit 40 to the dispensing unit 50. When the grabbing unit 40 coupled with the empty return tray 30 moves near the dispensing unit 50, transferring wheels 51 rotate to take the tray 30. The transferring wheels 51 stop rotating by side sensors 54 detecting the proper position of the tray. An opening gate 16 opens, allowing a customer to return the item 31.

At step 260, the item is received on the empty return tray 30 in the dispensing unit 50. In an embodiment, the item 31 can be received on the empty return tray 30 in the dispensing unit 50 and RFID sensor 55 identifies the item 31. Optionally, a monitoring camera 57 can take pictures of the item 31. The opening gate 16 closes to move the transferring wheels 51.

At step 270, a command is sent to a conveyer control system indicating a location to return the return tray 30. In an embodiment, the automated kiosk 10 can send a command to the conveyer control system 70 indicating that the return tray is to be returned to a return location.

At step 280, the dispensing unit 50 and the grabbing unit 40 return the return tray to a storage location. In an embodiment, the dispensing unit 50 and the grabbing unit 40 move the return tray to the storage location by the following action. When the opening gate 16 closes, the transferring wheels 51 rotate reversely to move the return tray towards the grabbing unit 40. The grabbing belts 42 rotate reversely to pick up the return tray and transfer the return tray to the grabbing unit 40. The grabbing unit 40 moves to the designated return location and grabbing belts 42 rotate to transfer the return tray to the return location. The grabbing belts 42 stop rotating by bottom sensors 44 detecting the absence of the return tray. The return location may be a location in the front stocker 21 or the rear stocker 24. The storage location may also be in storage area 60. Some items may need specified storage area for traceability.

At step 290, the automated kiosk 10 stores the location information of return tray 30 in a database. In an embodiment, the automated kiosk 10 stores the information of the return tray and updates the location of empty slots 23 and trays 30 in a database. Besides the location information, the database can contain information such as the operation log record, the item history and others for traceability and security.

Figure 25:
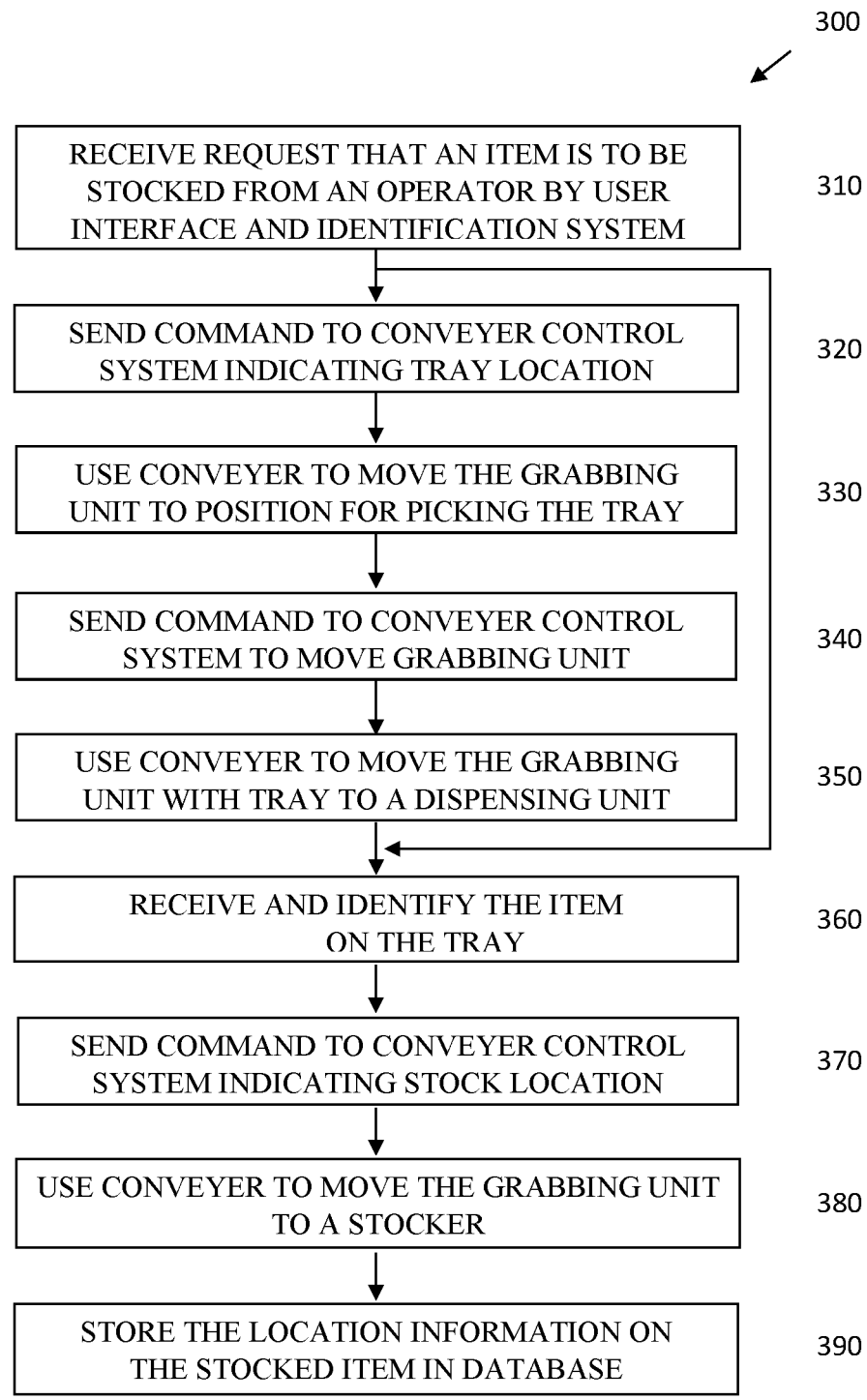
FIG. 25 is a flowchart illustrating a method for stocking an item, according to a non-limiting embodiment.

FIG. 25 shows an exemplary method 300 of stocking an item 31 to an automated kiosk 10, according to a non-limiting embodiment. It is emphasized that the steps need not be performed in the exact sequence as shown.

At step 310, a stocking request is received indicating a tray 30 with an item 31 to be stocked (a "stocking tray"). In an embodiment, the stocking request can be received by the automated kiosk 10 from an operator through the user interface display 12 and payment and identification unit 14 to stock the item 31. Some items used in the fields of healthcare can require more strict identification process to an operator for security and traceability. After step 310, depending on an empty stocking tray 30 which is to be used for holding the item, either step 320 or step 360 is performed after step 310. When the empty stocking tray 30 stored inside the automated kiosk 10 is used, a method of stocking an item is similar to a method of returning an item. When the empty stocking tray 30 outside the automated kiosk 10 is used, steps 320-350 for transferring the empty stocking tray 30 are skipped.

At step 320, a command is sent to a conveyer control system indicating the location of the empty stocking tray 30. In an embodiment, the automated kiosk can send a command to the conveyer control system 70 indicating that the empty stocking tray 30, now empty, is placed in a restock area 61.

At step 330, the conveyer unit 20 is used to move grabbing unit 40 into position for coupling with the empty stocking tray 30. In an embodiment, the conveyer unit 20 is used to move the grabbing unit 40 to the empty stocking tray 30 in the restock area 61 by the same action as described at step 230.

At step 340, a command is sent to a conveyer control system indicating the location of the dispensing unit 50. In an embodiment, the automated kiosk 10 can send a command to the conveyer control system 70 indicating that the empty stocking tray 30 is to be dispensed to the dispensing unit 50.

At step 350, a conveyer unit 20 is used to move a grabbing unit with a coupled empty stocking tray 30 to a dispensing unit 50. In an embodiment, the conveyer unit 20 is used to move the grabbing unit 40 to the dispensing unit 50 by the same action as described step 250.

At step 360, the item is received on the empty stocking tray 30 in the dispensing unit 50. In an embodiment, the item 31 can be received on the empty stocking tray 30 in the dispensing unit 50 and RFID sensor 55 detects the item 31. The opening gate 16 closes.

At step 370, a command is sent to a conveyer control system indicating a location to stock the stocking tray. In an embodiment, the automated kiosk 10 can send a command to the conveyer control system 70 indicating that the stocking tray is to be placed in a restock area 61.

At step 380, the dispensing unit 50 and the grabbing unit 40 stock the stocking tray to a storage location. In an embodiment, the dispensing unit 50 and the grabbing unit 40 move the stocking tray reversely to the restock area 61 by the same action as described step 280.

At step 390, the automated kiosk 10 stores the location information of a stocking tray in a database. In an embodiment, the automated kiosk 10 stores the information of the stocking tray and updates the location of empty slots 23 and trays 30 in a database by the same action as described step 290.

Figure 26:
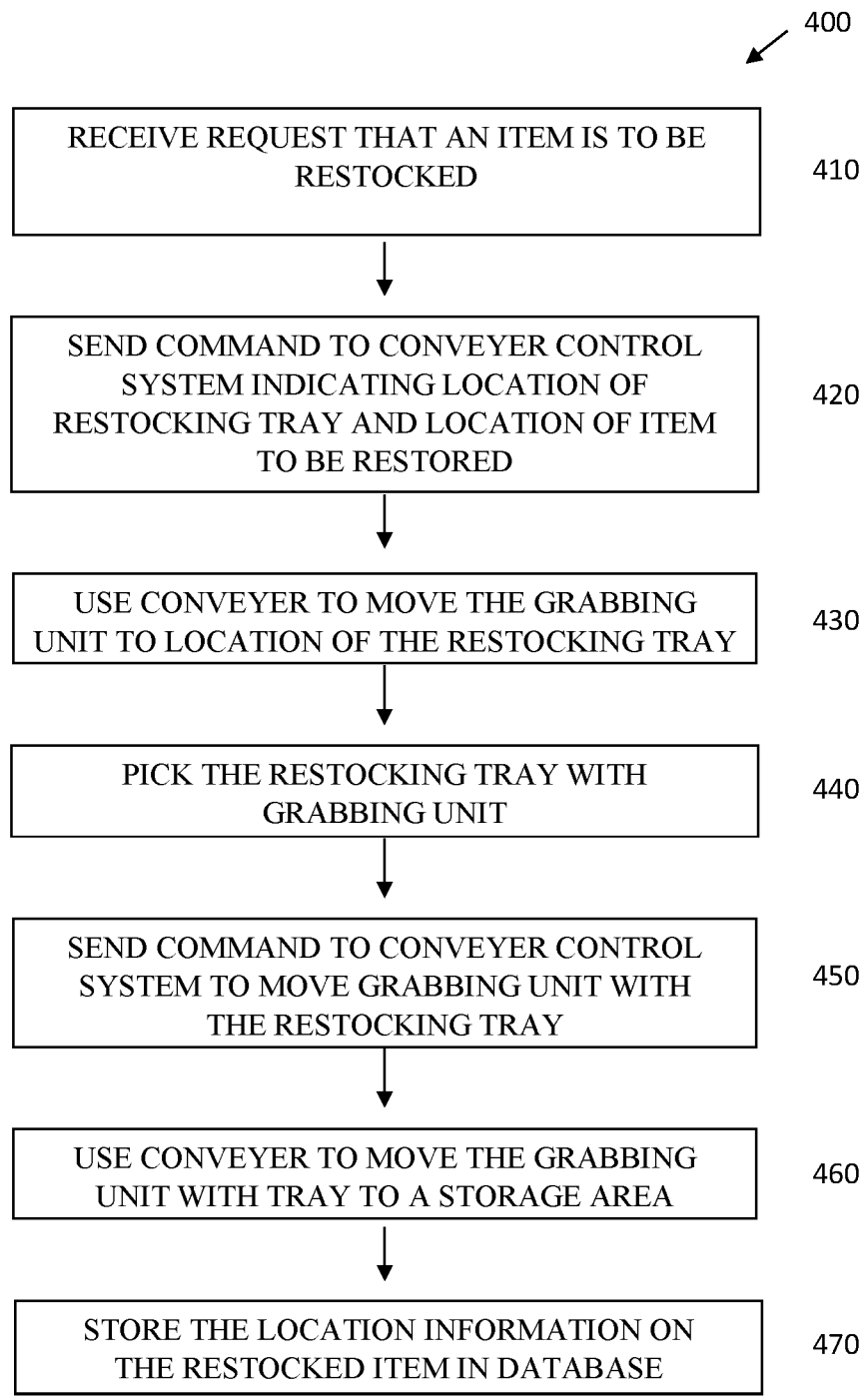
FIG. 26 is a flowchart illustrating a method for restocking an item, according to a non-limiting embodiment.

FIG. 26 shows an exemplary method 400 of restocking an item 31 to an automated kiosk 10, according to a non-limiting embodiment. It is emphasized that the steps need not be performed in the exact sequence as shown.

At step 410, a restocking request is received indicating a tray 30 with an item 31 to be restocked (a "restocking tray"). In an embodiment, the restocking request can be received by the automated kiosk 10 upon recognition that an item 31 is out of stock. The restocking request can be received by the automated kiosk 10 after stocking an item 31 is completed by an operator.

At step 420, a command is sent to a conveyer control system indicating the location of the restocking tray and a location of the item to be restocked. In an embodiment, the automated kiosk 10 can send a command to the conveyer control system 70 indicating that a storage area 60 is to be stocked with the restocking tray located in a restock area 61. Before moving the conveyer unit 20, a separating door 62 may open to move a grabbing unit 40.

At step 430, a conveyer unit 20 is used to move a grabbing unit 40 into position for coupling with the restocking tray. In an embodiment, the conveyer unit 20 is used to move the grabbing unit 40 to the restock area 61 where an empty restocking tray 30 is holding the item 31. The grabbing unit 40 moves close to the restocking tray using a lead screw motor 43 and grabbing belts 42 rotate to pick up the restocking tray. The grabbing belts 42 stop rotating by bottom sensors 44 detecting the proper position of the restocking tray. The grabbing unit 40 can include an RFID sensor to identify the item 31.

At step 440, a command is sent to the conveyer control system indicating a location to stock the restocking tray. In an embodiment, the automated kiosk 10 can send a command to the conveyer control system 70 indicating that the restocking tray is to be stocked to a storage area 60.

At step 450, the grabbing unit 40 places the restocking tray in its designated stocking location. In an embodiment, the grabbing unit 40 moves the restocking tray to the storage area 60. The grabbing unit 40 moves close to the designated slot 23 in the storage area 60 using a lead screw motor 43 and grabbing belts 42 rotate to transfer the restocking tray 30 to the slot 23. The grabbing belts 42 stop rotating by bottom sensors 44 detecting the absence of the restocking tray.

At step 460, the automated kiosk 10 stores the location information of a restocking tray in a database. In an embodiment, the automated kiosk 10 stores the information of the restocking tray and updates the location of empty slots 23 and trays 30 in a database. Besides the location information, the database can contain information such as the operation log record, the item history and others for traceability and security.

Figure 27:
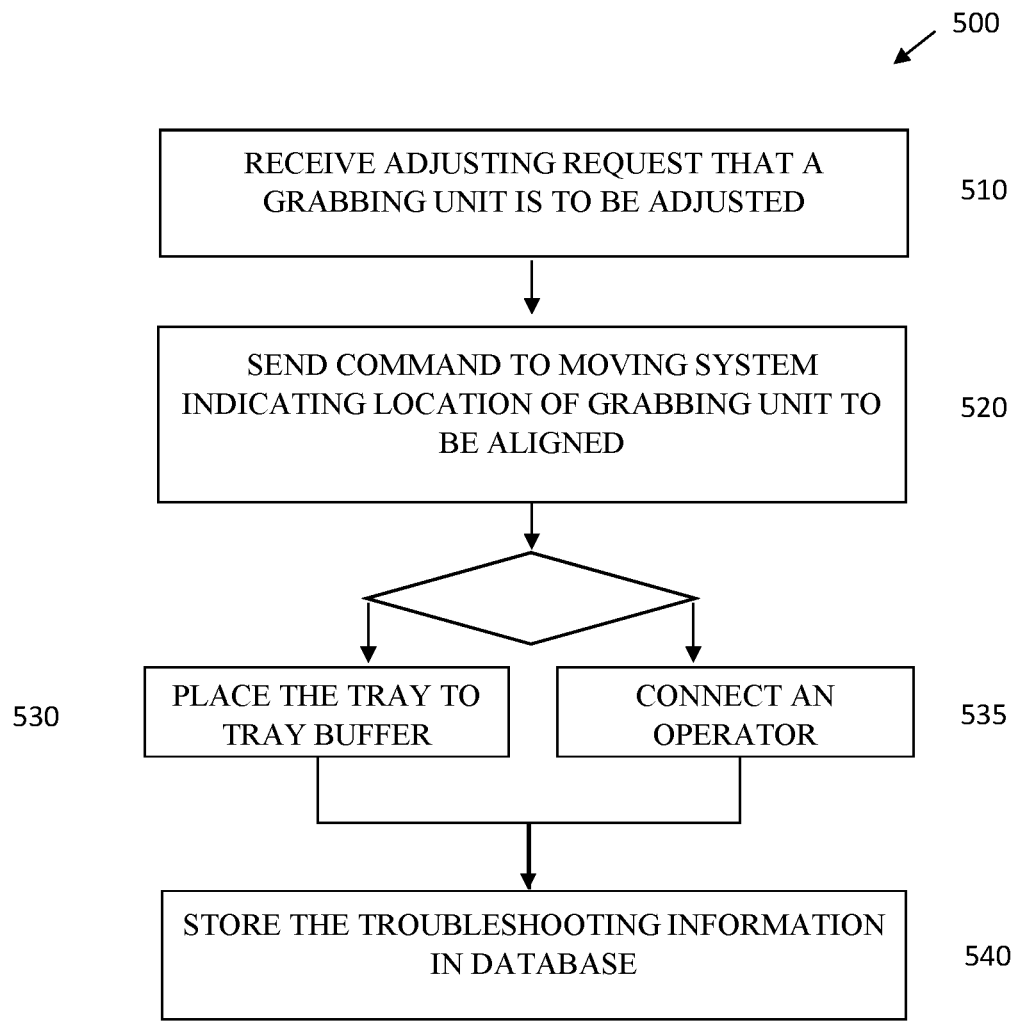
FIG. 27 is a flowchart illustrating a method for troubleshooting an automated kiosk, according to a non-limiting embodiment.

FIG. 27 shows an exemplary method 500 of troubleshooting an automated kiosk 10, according to a non-limiting embodiment. It is emphasized that the steps need not be performed in the exact sequence as shown. There may be alignment troubles arising from many reasons such as tray deformations, item dimensions, vibration, leveling or moving speed.

At step 510, an adjusting request is received indicating a tray 30 or a tray 30 with an item 31 to be adjusted properly. In an embodiment, the adjusting request can be received by the automated kiosk 10 upon recognition that a tray 30 or a tray 30 with an item 31 is misaligned with a slot 23.

At step 520, a command is sent to a conveyer control system indicating the location of the grabbing unit to be aligned. In an embodiment, when the grabbing unit 40 fails to pick up or transfer a tray 30, the grabbing unit 40 moves within setting ranges. The grabbing unit 40 adjusts its vertical coordinates and approaches slot 23 by setting trial numbers. The trial numbers can be set by a control system 26. At step 520, if the command is accomplished, then next step is step 540. If the command fails, the next step is step 530 or step 535.

After step 520, depending on the conditions of the automated kiosk 10, either step 530 or 535 is performed. In embodiments, when a grabbing unit 40 cannot place a tray 30 or a tray 30 with an item 31 to proper slots, the next step is determined by the conditions of the automated kiosk 10. At step 530, the tray 30 or the tray 30 with the item 31 is placed in tray buffer area 25. At step 535, a command is sent to a control system 26 to connect an operator at a customer service center for troubleshooting.

At step 540, the automated kiosk 10 stores trouble shooting information in a database. In an embodiment, the automated kiosk 10 stores the information of troubleshooting in a database for traceability and security.

Numerous advantages of the present invention should be apparent from the above. In various embodiments, the present invention is capable of storing and dispensing an item. In particular, the present invention may store and dispense items which are thin, small or delicate. The present invention also provides a control system configured to send commands to the conveyor unit, grabbing unit and dispensing unit, and to store the locations of items and tray in the automated kiosk. In an embodiment, the present invention is capable of restricting access to items by providing a separate stocking area and restock area, the stocking area configured to stock items, and the restock area configured to accept and deliver items.

The present invention also provides methods of vending, returning, stocking and restocking items. In some embodiments, the location and other item information may be stored in a database.

The scope of the claims should not be limited by the embodiments set forth in the above examples, but should be given the broadest interpretation consistent with the description as a whole.

The invention claimed is:

1. An automated kiosk comprising:
   an enclosure housing a storing structure comprising:
   (i) a storage area configured to store items to be delivered; and
   (ii) a restock area configured to accept items to be restocked and to deliver items;
   the storing structure supporting at least one slot, the at least one slot supporting at least one tray configured to carry an item;
   at least one grabbing unit configured to pick up the at least one tray;
   the at least one grabbing unit connected to a conveyer mechanism configured to position the at least one grabbing unit;
   at least one dispensing unit including an opening gate and a shutter associated with the opening gate, wherein the shutter is closed when the opening gate is open to deliver the item, the at least one dispensing unit associated with the at least one grabbing unit, wherein the opening gate is closed when the shutter is open to receive the item from the at least one grabbing unit;
a control system configured to send commands to the conveyer mechanism, the at least one grabbing unit and the at least one dispensing unit; and
a user interface configured to receive a request from a user; and
wherein the storage area and the restock area comprises at least one separating door for blocking external access, the at least one separating door including a pass-through for resting the grabbing unit.

2. The automated kiosk of claim 1 wherein the at least one tray for holding the item comprises at least one wing and at least one wall, the at least one wing configured to contact the at least one grabbing unit and the at least one dispensing unit, the at least one wall defining an area for holding the item securely.

3. The automated kiosk of claim 1 wherein the at least one tray for holding the item comprises the at least one wing associated with at least one grabbing belt of the at least one grabbing unit and at least one transferring wheel of the at least one dispensing unit, the at least one wing configured to contact the at least one grabbing belt and the at least one transferring wheel.

4. The automated kiosk of claim 1 wherein the at least one tray for holding the item comprises at least one wall defining an area for holding the item securely.

5. The automated kiosk of claim 1 wherein the storing structure comprises a front stocker configured to stock items and a rear stocker configured to stock items, wherein the at least one grabbing unit is placed between the front stocker and the rear stocker.

6. The automate kiosk of claim 1 further comprising at least one biometric device for secure user identification.

7. The automated kiosk of claim 1, wherein the opening gate further comprises a tray lock to prevent the tray from being removed from the automated kiosk.

8. The automated kiosk of claim 1, further comprising a buffer area to hold trays identified as having a problem.

9. A method for vending an item from an automated kiosk comprising:
receiving a vending request indicating the item to be vended;
sending a command to a conveyer control system;
using the conveyer control system to move a grabbing unit into position for coupling with a tray in a storage area of the automated kiosk;
using the conveyor control system to move the grabbing unit from the storage area to a restock area through a pass-through of a separating door, the separating door blocking external access to the storage area;
using the conveyer control system to move the grabbing unit into position for transferring the tray to a dispensing unit;
opening an opening gate of the dispensing unit to deliver the item;
simultaneously with the opening, closing a shutter of the dispensing unit to prevent access to an interior of the automated kiosk;
identifying delivery of the item;
returning the tray to a location; and
storing location information of the location of the tray in a database.

10. The method of claim 9 further comprising identifying a user for security and traceability with at least one biometric device.

11. A method for returning an item to an automated kiosk comprising:
receiving a return request indicating the item to be returned;
sending a command to a conveyer control system;
using the conveyer control system to move a grabbing unit into position for coupling with a tray;
using the conveyer control system to move the grabbing unit into position for transferring the tray to a dispensing unit in a restock area of the automated kiosk;
receiving the item on the tray;
identifying acceptance of the item;
opening a shutter of the dispensing unit to transfer the tray to the grabbing unit;
simultaneously with the opening, closing an opening gate of the dispensing unit;
using the conveyor control system to move the grabbing unit from the restock area to a storage area of the automated kiosk, the grabbing unit moving through a pass-through of a separating door, the separating door blocking external access to the storage area;
using the conveyer control system to move the grabbing unit into position for returning the tray with the item to a location in the storage area; and
storing location information of the location of the tray with the item in a database.

12. A method for stocking an item in an automated kiosk comprising:
receiving a request indicating the item to be stocked;
receiving the item on a tray from a user at a dispensing unit in a restock area of the automated kiosk;
identifying acceptance of the item;
opening a shutter of the dispensing unit to transfer the tray to the grabbing unit;
simultaneously with the opening, closing an opening gate of the dispensing unit;
using the conveyor control system to move the grabbing unit from the restock area to a storage area of the automated kiosk, the grabbing unit moving through a pass-through of a separating door, the separating door blocking external access to the storage area;
using a conveyer control system to move a grabbing unit into position for stocking the tray with the item to a location in the storage area of the automated kiosk; and
storing location information of the location of the tray with the item in a database.

13. The method of claim 12 further comprising identifying a user for security and traceability with at least one biometric device.

14. A method for restocking an item in an automated kiosk comprising:
receiving a request indicating that an item to be restocked;
sending a command to a conveyer control system;
using the conveyer control system to move a grabbing unit into position for coupling with a tray to be restocked from a restocking rack in a restock area of the automated kiosk;
using the conveyer control system to move the grabbing unit with the tray to a location in a storage area of the automated kiosk, the grabbing unit moving through a pass-trough of a separating door, the separating door blocking external access to the storage area; and
storing location information of the location of the tray with the item in a database.

15. The method of claim 14 comprising:
opening at least one separating door, the at least one separating door disposed between the restock area and the storage area for blocking external access to the storage area; and
moving the grabbing unit after the at least one door for blocking external access opens.

16. The method of claim 14, further comprising:
receiving an adjusting request to adjust a misaligned tray;
sending an adjusting command to the conveyor control system; and
using the conveyer control system to move the grabbing unit into position for coupling with the misaligned tray to realign the misaligned tray.

17. The method of claim 16, further comprising, when the grabbing unit fails to couple with the misaligned tray, adjusting vertical coordinates of the grabbing unit for coupling with the misaligned tray.

\* \* \* \* \*